(12) United States Patent
Tanizawa et al.

(10) Patent No.: US 10,609,376 B2
(45) Date of Patent: *Mar. 31, 2020

(54) ENCODING DEVICE, DECODING DEVICE, ENCODING METHOD, AND DECODING METHOD FOR CODING EFFICIENCY

(71) Applicant: KABUSHIKI KAISHA TOSHIBA, Tokyo (JP)

(72) Inventors: Akiyuki Tanizawa, Kanagawa (JP); Takeshi Chujoh, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,916

(22) Filed: Mar. 6, 2019

(65) Prior Publication Data

US 2019/0200019 A1 Jun. 27, 2019

Related U.S. Application Data

(63) Continuation of application No. 15/438,357, filed on Feb. 21, 2017, now Pat. No. 10,277,900, which is a
(Continued)

(51) Int. Cl.
*H04N 19/13* (2014.01)
*H04N 19/105* (2014.01)
(Continued)

(52) U.S. Cl.
CPC .......... *H04N 19/13* (2014.11); *H04N 19/105* (2014.11); *H04N 19/147* (2014.11); *H04N 19/15* (2014.11);
(Continued)

(58) Field of Classification Search
CPC .. H04N 19/513; H04N 19/147; H04N 19/176; H04N 19/196; H04N 19/44;
(Continued)

(56) References Cited

U.S. PATENT DOCUMENTS 7,242,716 B2    7/2007   Koto et al.
7,450,643 B2    11/2008  Chujoh et al.
(Continued)

FOREIGN PATENT DOCUMENTS

AU    2011379259 B2    4/2013
AU    2012383769 B2    2/2014
(Continued)

OTHER PUBLICATIONS

Philippe Bordes, "Weighted Prediction" JCT-VC of ITU-TSGI 6 WP3 and ISO/I ECJTC1/SC29/WG11,6th Meeting, Torino, IT Jul. 2011 (Year: 2011).*
(Continued)

*Primary Examiner* — Ayman A Abaza
(74) *Attorney, Agent, or Firm* — Oblon, McClelland, Maier & Neustadt, L.L.P.

(57) ABSTRACT

According to an embodiment, an encoding device includes a deriving unit and an encoding unit. The deriving unit is configured to derive a first reference value based on fixed point precision representing roughness of a weighting factor that is used for multiplying a reference image. The encoding unit is configured to encode a first difference value that is a difference value between the weighting factor and the first reference value and the fixed point precision. The weighting factor is included in a first range of predetermined bit precision having the first reference value at approximate center. The first difference value is in the predetermined range.

10 Claims, 30 Drawing Sheets

Related U.S. Application Data continuation of application No. 14/725,941, filed on May 29, 2015, now Pat. No. 9,621,914, which is a continuation of application No. 14/026,727, filed on Sep. 13, 2013, now Pat. No. 9,462,291, which is a continuation of application No. PCT/JP2012/066410, filed on Jun. 27, 2012.

(51) Int. Cl.

| | | |
|---|---|---|
| H04N 19/176 | (2014.01) | |
| H04N 19/70 | (2014.01) | |
| H04N 19/147 | (2014.01) | |
| H04N 19/196 | (2014.01) | |
| H04N 19/463 | (2014.01) | |
| H04N 19/577 | (2014.01) | |
| H04N 19/44 | (2014.01) | |
| H04N 19/513 | (2014.01) | |
| H04N 19/547 | (2014.01) | |
| H04N 19/61 | (2014.01) | |
| H04N 19/625 | (2014.01) | |
| H04N 19/15 | (2014.01) | |
| H04N 19/182 | (2014.01) | |
| H04N 19/184 | (2014.01) | |
| H04N 19/186 | (2014.01) | |

(52) U.S. Cl.
CPC ......... *H04N 19/176* (2014.11); *H04N 19/196* (2014.11); *H04N 19/44* (2014.11); *H04N 19/463* (2014.11); *H04N 19/513* (2014.11); *H04N 19/547* (2014.11); *H04N 19/577* (2014.11); *H04N 19/61* (2014.11); *H04N 19/625* (2014.11); *H04N 19/70* (2014.11); *H04N 19/182* (2014.11); *H04N 19/184* (2014.11); *H04N 19/186* (2014.11)

(58) Field of Classification Search
CPC .. H04N 19/463; H04N 19/547; H04N 19/577; H04N 19/61; H04N 19/625; H04N 19/70
USPC .................................................... 375/240.16
See application file for complete search history.

(56) References Cited

U.S. PATENT DOCUMENTS

| | | |
|---|---|---|
| 7,616,691 B2 | 11/2009 | Chujoh et al. |
| 9,521,422 B2 | 12/2016 | Tanizawa et al. |
| 2003/0215014 A1 | 11/2003 | Koto et al. |
| 2004/0057523 A1 | 3/2004 | Koto et al. |
| 2004/0141615 A1 | 7/2004 | Chujoh et al. |
| 2005/0243931 A1 | 4/2005 | Yasuda et al. |
| 2006/0093038 A1 | 5/2006 | Boyce |
| 2006/0133486 A1 | 6/2006 | Boyce |
| 2006/0198440 A1 | 9/2006 | Yin et al. |
| 2007/0031065 A1 | 2/2007 | Sun |
| 2007/0174062 A1 | 7/2007 | Mehrotra et al. |
| 2008/0253456 A1 | 10/2008 | Yin |
| 2009/0010330 A1 | 1/2009 | Tourapis et al. |
| 2009/0116759 A1 | 5/2009 | Suzuki et al. |
| 2011/0007893 A1 | 1/2011 | Sunar |
| 2014/0056357 A1 | 2/2014 | Tanizawa et al. |
| 2014/0072237 A1 | 3/2014 | Tanizawa et al. |
| 2014/0079125 A1 | 3/2014 | Tanizawa et al. |
| 2016/0050428 A1 | 2/2016 | Tanizawa et al. |
| 2017/0164006 A1 | 6/2017 | Tanizawa et al. |

FOREIGN PATENT DOCUMENTS

| | | | |
|---|---|---|---|
| EP | 2 375 754 A1 | 10/2011 | |
| EP | 2375754 A1 * | 10/2011 | ........... H04N 19/176 |
| JP | 2004-7377 A | 1/2004 | |
| JP | 2004-7379 A | 1/2004 | |
| JP | 2007-81518 | 3/2007 | |
| JP | 2009-525687 | 7/2009 | |
| KR | 10-2004-0028913 A | 4/2004 | |
| RU | 2 335 860 C2 | 10/2008 | |
| RU | 2 391 794 c2 | 6/2010 | |
| RU | 2 422 987 C2 | 6/2011 | |
| WO | WO 2006/128072 A2 | 11/2006 | |
| WO | 2011/032852 A1 | 3/2011 | |
| WO | 2011/124676 A1 | 10/2011 | |
| WO | WO 2011/126288 A2 | 10/2011 | |

OTHER PUBLICATIONS

International Search Report dated Oct. 2, 2012 for PCT/JP2012/066410 filed on Jun. 27, 2012 with English Translation of Categories.

International Written Opinion dated Oct. 2, 2012 for PCT/JP2012/066410 filed on Jun. 27, 2012.

Akiyuki Tanizawa, et al., "Redundancy removal of explicit weighted prediction syntax"., Joint Collaborative Team on Video Coding (JCT-VC) of ITU-T SG16 WP3 and ISO/IEC JTC1/SC29/WG11, JCTVC-G441, 7th Meeting: Geneva, CH, Nov. 21-30, 2011.

Information technology, Coding of audio-visual objects Part 10 Advanced video coding FDAmd AVC professional extensions, ISO/IEC 14496, 10, 2004.

Philippe Bordes, "Weighted Prediction"., Joint Collaborative Team on Video Coding (JCT-VC) of ITU-T SG16 WP3 and ISO/IEC JTC1/SC29/WG11, Doc: JCTVC-F265, 6th Meeting: Torino, IT, Jul. 14-22, 2011.

Office Action dated Jul. 22, 2014 in a corresponding Japanese Patent Application No. 2013-543440 (with English Translation).

Japanese Office Action dated Oct. 21, 2014, in Japan Patent Application No. 2013-543440 (with English translation).

Office Action dated Jan. 15, 2015 in Australian Patent Application No. 2012383769.

Office Action dated Feb. 27, 2015 in Mexican Patent Application No. MX/a/2014/002541 (with English language translation).

Akiyuki Tanizawa, et al., "Redundancy removal of explicit weighted prediction syntax" Joint Collaborative Team on Video Coding (JCT-VC) of ITU-T SG16 WP3 and ISO/IEC JTC1/SC29/WG11, JCTVC-G441, 7th Meeting: Geneva, CH, Nov. 21-30, 2011, 7 Pages.

Korean Office Action dated Jun. 4. 2015 in Patent Application No. 10-2014-7005650 (with English Translation).

Office Action dated Jun. 11, 2015 in Canadian Patent Application No. 2,847,304.

Office Action dated Dec. 8, 2015 in Japanese Patent Application No. 2015-009820 (with unedited computer generated English translation).

Office Action dated Jan. 15, 2016 in Korean Patent Application No. 10-2015-7031715 (with English language translation).

Office Action dated Feb. 2. 2016 in Japanese Patent Application No. 2015-009820 (with unedited computer generated English translation).

Extended European Search Report dated Apr. 15, 2016 in Patent Application No. 12870927.6.

Combined Office Action and Search Report dated Apr. 28, 2016 in Russian Patent Application No. 2014107491 (with English language translation).

Office Action dated Jun. 14, 2016 in Canadian Patent Application No. 2,847,304.

Akiyuki Tanizawa, et al., "Revised text of explicit weighted prediction in HM WD6" Joint Collaborative Team on Video Coding (JCT-VC) of ITU-T SG 16 WP 3 and ISO/IEC JTC 1/SC 29/WG 11, Document: JCTVC-I0279, XP030112042, Apr. 27-May 7, 2012, pp. 1-8.

Combined Chinese Office Action and Search Report dated Jul. 4, 2016 in Patent Application No. 201280042152.7 (with English language translation).

JCTVC-I0260 WD changes r1.docs, Apr. 2012. http://phenix.it-sudparis.eu/jct/doc_end_user/documents/9_Geneva/wg11/JSTVC-I0260-v3.zip.

(56) References Cited

OTHER PUBLICATIONS

Japanese National Publication of International Patent Application No. 2005-533467 corresponding to U.S. 2004/0008783 A1.
Jun Xu et al., Differentiated weighting parameter sets for weighted prediction, Join Collaborative Team on Video Coding (JCT-VC) of ITU-T SG16 WP3 and ISO/IEC JTC1/SC29/WG11, 8th Meeting: San Jose, CA, USA, Feb. 2012, JCTVC-H0401r2, pp. 1-11.
Yong He et al., On Weighted Prediction Parameter Signaling, Joint Collaborative Team on Video Coding (JCT-VC) of ITU-T SG 16 WP 2 and ISO/IEC JTC 1/SC 29/WG 11, 9th Meeting: Geneva, CH, Apr. 2012, JCTVC-I0260 r1, pp. 1-13.
Akiyuki Tanizawa et al., Proposed modifications of explicit weighted prediction, Joint Collaborative Team of Video Coding (JCT-VC) of ITU-T SG 16 WP 3 and ISO/IEC JTC 1/SC 29/WG 11, 9th Meeting: Geneva, CH, Apr. 2012, JCTVC-I0279r1, pp. 1-10.
Akiyuki Tanizawa et al., Clean-up of semantics and decoding process on weighted prediction, Joint Collaborative Team on Video Coding (JCT-VC) of ITU-T SG 16 WP 3 and ISO/IEC JTC 1/SC 29/WG 11, 10th Meeting: Stockholm, SE, Jul. 2012, JCTVC-J0221_r1, pp. 1-9.
Jill M. Boyce, "Weighted Prediction in the H.264/MPEG AVC Video Coding Standard", Thompson-Corporate Research Princeton, 2004, pp. 789-792.
Extended European Search Report dated May 4, 2015 in Patent Application No. 11874283.2.
Australian Office Action dated Nov. 20, 2014, in Australian Patent Application No. 2011379259.
Combined Taiwanese Office Action and Search Report dated Sep. 4, 2014 in Patent Application No. 101101751 (with English language translation).
International Search Report and Written Opinion dated Jan. 17. 2012, in International Application No. PCT/JP2011/073852. (with English translation).
Sugimoto et al., "Description of video coding technology proposal by Mitsubishi Electric," Joint Collaborative Team on Video Coding (JCT-VC) of ITU-T SG16 WP3 and ISO/IEC JTC1/SC29/WG11,1st Meeting, Apr. 2010, 17 pages.
Office Action dated May 22, 2015 in Korean Patent Application No. 10-2014-7005644 (with English language translation).
Office Action dated Jun. 10, 2015 in Canadian Patent Application No. 2,847,299.
Office Action dated Sep. 28, 2015 in Russian Patent Application No. 2014107490 (with English language translation).
Office Action dated Jan. 27, 2016 in Korean Patent Application No. 10-2014-7005644 (with English language translation).
Combined Office Action and Search Report dated Apr. 12, 2016 in Taiwanese Patent Application No. 104113292 (with English language translation).
Office Action dated May 27, 2016 in Mexican Patent Application No. MX/a/2016/000809 (with English language translation).
Combined Office Action and Search Report dated Jul. 4, 2016 in Chinese Patent Application No. 201180073122.8 with English translation.
Office Action dated Sep. 2, 2016 in Korean Patent Application No. 10-2015-7030535 (with English language translation).
Akiyuki Tanizawa et al., AHG18: Explicit Weighted Prediction with simple WP parameter estimation, Joint Collaborative Team on Video Coding (JCT-VC) of ITU-T SG16 WP3 and ISO/IEC JTC1/SC29/WG11, 6th Meeting: Torino, IT, Jul. 2011, JCTVC-F326r1, pp. 1-9.
Office Action dated Apr. 24, 2018 in co-pending U.S. Appl. No. 15/438,333 Abaza, Ayman A.
Gary Sullivan, et al., Meeting report of the seventh meeting of the Joint Collaborative Team on 3D Video Coding Extension Development (JCT-3V), San Jose, US, Jan. 11-18, 2014, 52 pages.

* cited by examiner

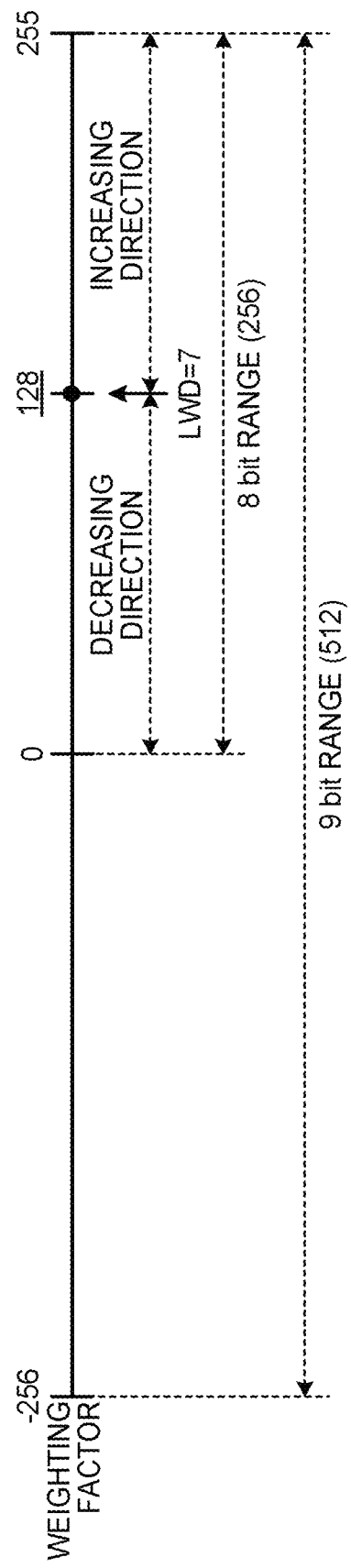

FIG.11

| LWD | REFERENCE VALUE (1<<LWD) | MINIMUM VALUE OF WEIGHTING FACTOR | MAXIMUM VALUE OF WEIGHTING FACTOR | MINIMUM VALUE OF FIXED DECIMAL PRECISION | MAXIMUM VALUE OF FIXED DECIMAL PRECISION |
|---|---|---|---|---|---|
| 7 | 128 | -128 | 127 | -1 | 0.99 |
| 6 | 64 | -128 | 127 | -2 | 1.98 |
| 5 | 32 | -128 | 127 | -4 | 3.97 |
| 4 | 16 | -128 | 127 | -8 | 7.94 |
| 3 | 8 | -128 | 127 | -16 | 15.88 |
| 2 | 4 | -128 | 127 | -32 | 31.75 |
| 1 | 2 | -128 | 127 | -64 | 63.50 |
| 0 | 1 | -128 | 127 | -128 | 127.00 |

FIG.12

| LWD | REFERENCE VALUE (1<<LWD) | MINIMUM VALUE OF WEIGHTING FACTOR | MAXIMUM VALUE OF WEIGHTING FACTOR | MINIMUM VALUE OF FIXED DECIMAL PRECISION | MAXIMUM VALUE OF FIXED DECIMAL PRECISION |
|---|---|---|---|---|---|
| 7 | 128 | 0 | 255 | 0 | 1.99 |
| 6 | 64 | -64 | 191 | -1 | 2.98 |
| 5 | 32 | -96 | 159 | -3 | 4.97 |
| 4 | 16 | -112 | 143 | -7 | 8.94 |
| 3 | 8 | -120 | 135 | -15 | 16.88 |
| 2 | 4 | -124 | 131 | -31 | 32.75 |
| 1 | 2 | -126 | 129 | -63 | 64.50 |
| 0 | 1 | -127 | 128 | -127 | 128.00 |

FIG.13A

| LIST NUMBER | 0 | | | | | | |
|---|---|---|---|---|---|---|---|
| REFERENCE NUMBER | 0 | 1 | 2 | 3 | 4 | ··· | N |
| WP APPLICATION FLAG | WP_flag[0] | WP_flag[1] | WP_flag[2] | WP_flag[3] | WP_flag[4] | ··· | WP_flag[N] |
| WEIGHTING FACTOR | Weight[0] | Weight[1] | Weight[2] | Weight[3] | Weight[4] | ··· | Weight[N] |
| OFFSET | Offset[0] | Offset[1] | Offset[2] | Offset[3] | Offset[4] | ··· | Offset[N] |

FIG.13B

| LIST NUMBER | 1 | | | | | | |
|---|---|---|---|---|---|---|---|
| REFERENCE NUMBER | 0 | 1 | 2 | 3 | 4 | ··· | N |
| WP APPLICATION FLAG | WP_flag[0] | WP_flag[1] | WP_flag[2] | WP_flag[3] | WP_flag[4] | ··· | WP_flag[N] |
| WEIGHTING FACTOR | Weight[0] | Weight[1] | Weight[2] | Weight[3] | Weight[4] | ··· | Weight[N] |
| OFFSET | Offset[0] | Offset[1] | Offset[2] | Offset[3] | Offset[4] | ··· | Offset[N] |

FIG.16

| pic_parameter_set_rbsp( ) { | Descriptor |
|---|---|
|    pic_parameter_set_id | u(8) |
|    seq_parameter_set_id | u(8) |
|    ... | |
|    num_ref_idx_l0_default_active_minus1 | ue(v) |
|    num_ref_idx_l1_default_active_minus1 | ue(v) |
|    weighted_pred_flag | u(1) |
|    weighted_bipred_idc | u(2) |
|    ... | |
|    rbsp_trailing_bits( ) | |
| } | |

FIG.17

| slice_header( ) { | Descriptor |
|---|---|
|    ... | |
|    slice_type | ue(v) |
|    pic_parameter_set_id | ue(v) |
|    ... | |
|    if( slice_type == P \|\| slice_type == B ) { | |
|       num_ref_idx_active_override_flag | u(1) |
|       if( num_ref_idx_active_override_flag ) { | |
|          num_ref_idx_l0_active_minus1 | ue(v) |
|          if( slice_type == B ) | |
|             num_ref_idx_l1_active_minus1 | ue(v) |
|       } | |
|    } | |
|    ... | |
|    if( ( weighted_pred_flag && ( slice_type == P ) ) \|\|<br>     ( weighted_bipred_idc == 1 && slice_type == B ) ) | |
|       pred_weight_table( ) | |
|    ... | |
| } | |

FIG.18

| pred_weight_table( ) { | Descriptor |
|---|---|
|   luma_log2_weight_denom | ue(v) |
|   if( chroma_format_idc != MONO_IDX) | |
|     delta_chroma_log2_weight_denom | ue(v) |
|   for( i = 0; i <= num_ref_idx_l0_active_minus1; i++ ) { | |
|     luma_weight_l0_flag | u(1) |
|     if( luma_weight_l0_flag ) { | |
|       delta_luma_weight_l0[ i ] | se(v) |
|       luma_offset_l0[ i ] | se(v) |
|     } | |
|     if ( chroma_format_idc != MONO_IDX) { | |
|       chroma_weight_l0_flag | u(1) |
|       if( chroma_weight_l0_flag ) { | |
|         for( j =0; j < COLOR_COMP - 1; j++ ) { | |
|           delta_chroma_weight_l0[ i ][ j ] | se(v) |
|           delta_chroma_offset_l0[ i ][ j ] | se(v) |
|         } | |
|       } | |
|     } | |
|   } | |
|   if( slice_type == B_SLICE ) | |
|     for( i = 0; i <= num_ref_idx_l1_active_minus1; i++ ) { | |
|       luma_weight_l1_flag | u(1) |
|       if( luma_weight_l1_flag ) { | |
|         delta_luma_weight_l1[ i ] | se(v) |
|         luma_offset_l1[ i ] | se(v) |
|       } | |
|       if( chroma_format_idc != MONO_IDX ) { | |
|         chroma_weight_l1_flag | u(1) |
|         if( chroma_weight_l1_flag ) { | |
|           for( j =0; j < COLOR_COMP - 1; j++ ) { | |
|             delta_chroma_weight_l1[ i ][ j ] | se(v) |
|             delta_chroma_offset_l1[ i ][ j ] | se(v) |
|           } | |
|         } | |
|       } | |
|     } | |
| } | |

FIG.19

| luma_log2_weight_denom | default_luma_weight_lx | MINIMUM VALUE OF luma_weight_lx[i] | MAXIMUM VALUE OF luma_weight_lx[i] | MINIMUM VALUE OF delta_luma_weight_lx[i] | MAXIMUM VALUE OF delta_luma_weight_lx[i] |
|---|---|---|---|---|---|
| 7 | 128 | 0 | 255 | -128 | 127 |
| 6 | 64 | -64 | 191 | -128 | 127 |
| 5 | 32 | -96 | 159 | -128 | 127 |
| 4 | 16 | -112 | 143 | -128 | 127 |
| 3 | 8 | -120 | 135 | -128 | 127 |
| 2 | 4 | -124 | 131 | -128 | 127 |
| 1 | 2 | -126 | 129 | -128 | 127 |
| 0 | 1 | -127 | 128 | -128 | 127 |

FIG.26

| luma_log2_weight_denom | default_luma_weight_lx | MINIMUM VALUE OF luma_weight_lx[i] | MAXIMUM VALUE OF luma_weight_lx[i] | MINIMUM VALUE OF delta_luma_weight_lx[i] | MAXIMUM VALUE OF delta_luma_weight_lx[i] |
|---|---|---|---|---|---|
| 7 | 128 | -128 | 127 | -256 | -1 |
| 6 | 64 | -128 | 127 | -192 | 63 |
| 5 | 32 | -128 | 127 | -160 | 95 |
| 4 | 16 | -128 | 127 | -144 | 111 |
| 3 | 8 | -128 | 127 | -136 | 119 |
| 2 | 4 | -128 | 127 | -132 | 123 |
| 1 | 2 | -128 | 127 | -130 | 125 |
| 0 | 1 | -128 | 127 | -129 | 126 |

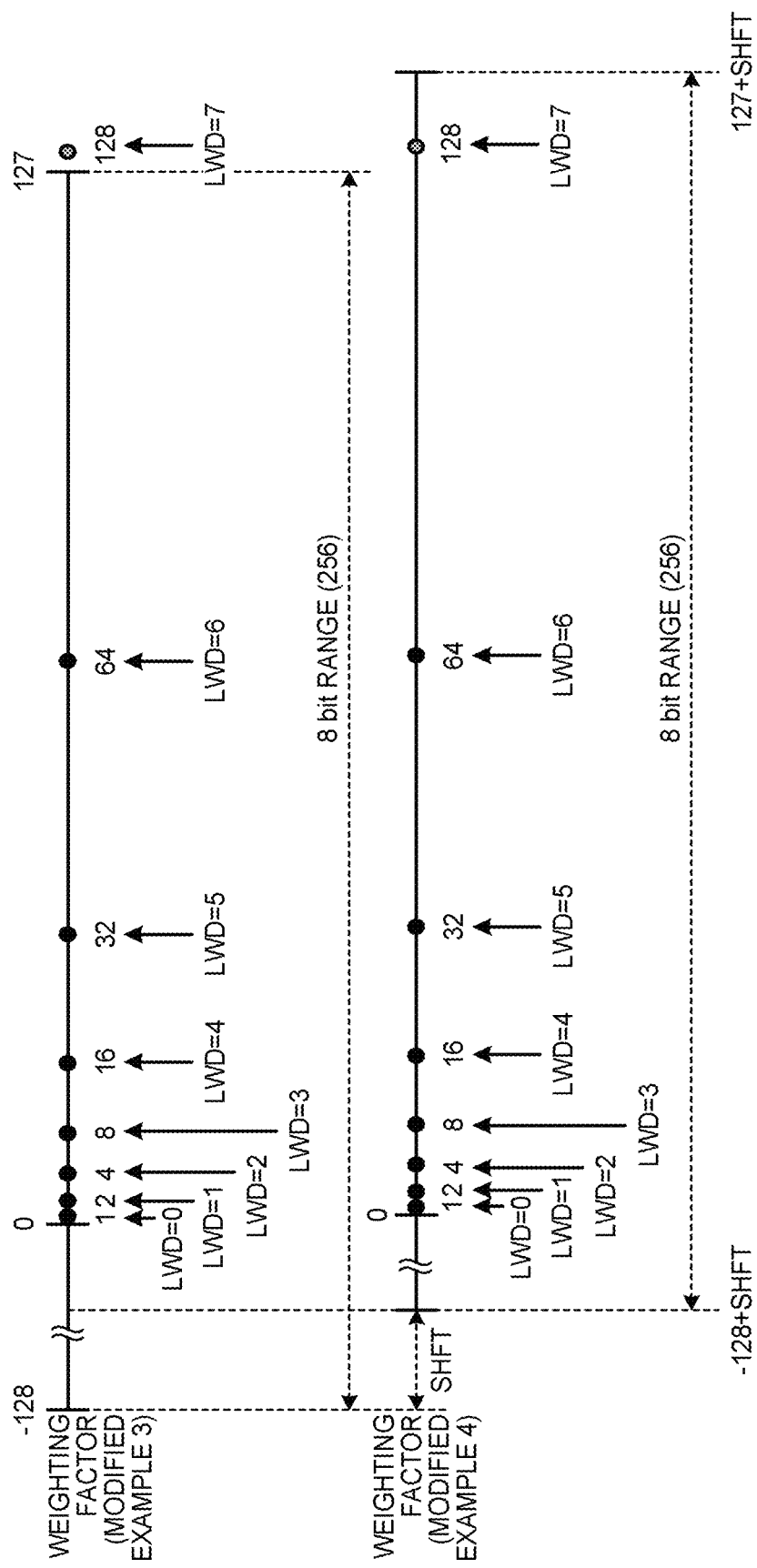

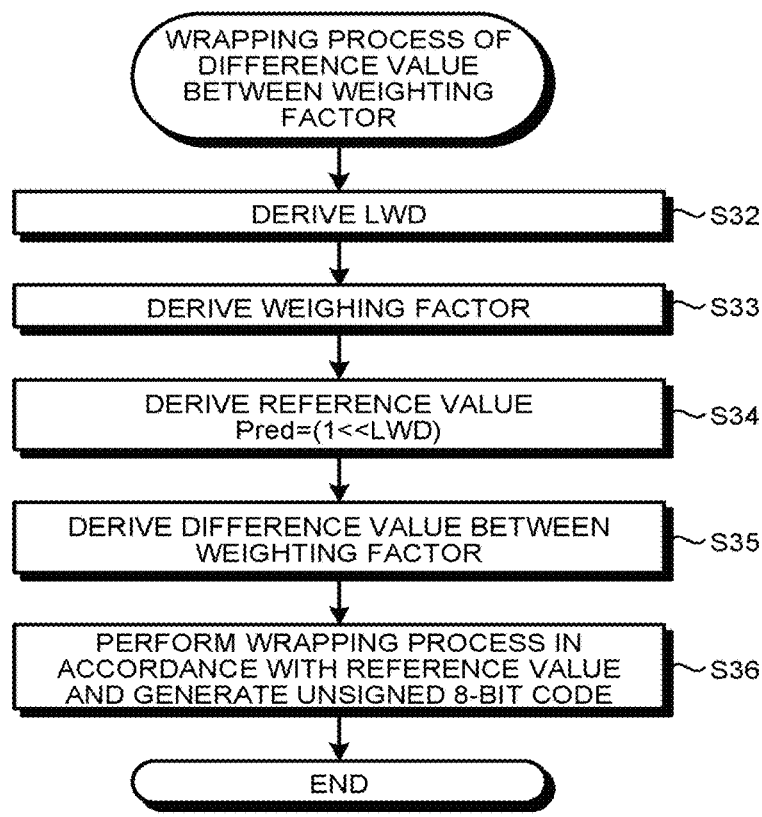
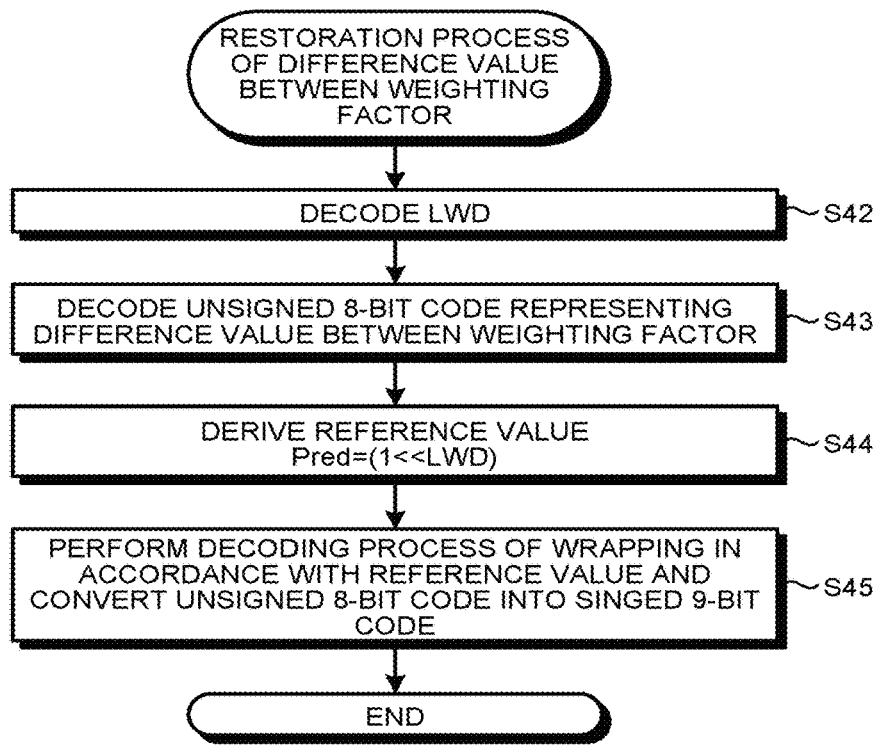

ENCODING DEVICE, DECODING DEVICE, ENCODING METHOD, AND DECODING METHOD FOR CODING EFFICIENCY

CROSS-REFERENCE TO RELATED APPLICATIONS

This application is a continuation application of U.S. application Ser. No. 15/438,357 filed Feb. 21, 2017, which is a continuation application of U.S. application Ser. No. 14/725,941 filed May 29, 2015, now U.S. Pat. No. 9,621,914, which is a continuation application of U.S. application Ser. No. 14/026,727 filed Sep. 13, 2013, now U.S. Pat. No. 9,462,291, which is a continuation of PCT international Application Ser. No. PCT/JP2012/066410, filed on Jun. 27, 2012, which designates the United States; the entire contents of each of which are incorporated herein by reference.

FIELD

Embodiments described herein relate generally to an encoding method, a decoding method, an encoding device, and a decoding device.

BACKGROUND

In recent years, a method of encoding an image with markedly improved coding efficiency is recommended as ITU-T REC. H.264 and ISO/IEC 14496-10 (hereinafter, referred to as "H.264") in cooperation of ITU-T (International Telecommunication Union Telecommunication Standardization Sector) and ISO (International Organization for Standardization)/IEC (International Electrotechnical Commission).

In H.264, an inter-prediction coding system is disclosed in which redundancy in the time direction is eliminated to achieve high coding efficiency by making a motion compensation prediction of fractional precision using a coded image as a reference image.

In addition, a system is proposed in which a moving image including a fading or dissolving effect is encoded with efficiency higher than that of an inter-prediction coding system according to ISO/IEC MPEG (Moving Picture Experts Group)-1, 2, 4. In this system, a motion compensation prediction of fractional precision is made for an input moving image having luminance and two color differences as frames for predicting a change in the brightness in the time direction. Then, by using a reference image, luminance, and a weighting factor for each luminance and two color differences, an offset and for each luminance and two color differences, and the like, a predicted image is multiplied by a weighting factor, and an offset is added thereto. The weighting factor can represent a fraction with predetermined precision using a parameter representing fixed point precision, and a weighted motion-compensated prediction can be made for a pixel value change between images with more delicate precision.

In a conventional technology as described above, while a reference image, a weighting factor, an offset, and the like are encoded as an index, the index is defined to be represented with predetermined bit precision, and accordingly, there are cases where a weighting factor cannot be represented. An object of the present invention is to provide an encoding method, a decoding method, an encoding device, and a decoding device capable of improving the coding efficiency while representing a weighting factor with predetermined bit precision.

BRIEF DESCRIPTION OF THE DRAWINGS

FIG. 10A is an explanatory diagram that illustrates a specific example of the selection range of the weighting factor according to the first embodiment;

FIG. 11 is a reference diagram that illustrates a minimum value and a maximum value of weighting factors of H.264;

FIG. 12 is an explanatory diagram that illustrates an example of a minimum value and a maximum value of weighting factors according to the first embodiment;

FIG. 13A is a diagram that illustrates an example of WP parameter information according to the first embodiment;

FIG. 13B is a diagram that illustrates an example of the WP parameter information according to the first embodiment;

FIG. 16 is a diagram that illustrates an example of picture parameter set syntax according to the first embodiment;

FIG. 17 is a diagram that illustrates an example of slider header syntax according to the first embodiment;

FIG. 18 is a diagram that illustrates an example of pred weight table syntax according to the first embodiment;

FIG. 19 is an explanatory diagram that illustrates an example of the relation of values of syntax elements according to the first embodiment;

FIG. 26 is an explanatory diagram that illustrates an example of the relation between values of syntax elements according to Modification 3;

FIG. 28 is an explanatory diagram that illustrates an example of the selection range of the weighting factor after decoding according to Modification 4;

FIG. 29 is a flowchart that illustrates an example of a wrapping process of a difference value between weighting factors according to Modification 5; and FIG. 30 is a flowchart that illustrates an example of a restoration process of a weighting factor according to Modification 5.

DETAILED DESCRIPTION

According to an embodiment, an encoding device includes a deriving unit and an encoding unit. The deriving unit is configured to derive a first reference value based on fixed point precision representing roughness of a weighting factor that is used for multiplying a reference image. The encoding unit is configured to encode a first difference value that is a difference value between the weighting factor and the first reference value and the fixed point precision. The weighting factor is included in a first range of predetermined bit precision having the first reference value at approximate center. The first difference value is in the predetermined range.

Hereinafter, embodiments will be described in detail with reference to the accompanying drawings. An encoding device and a decoding device according to each embodiment presented below may be implemented by hardware such as an LSI (Large-Scale Integration) chip, a DSP (Digital Signal Processor), or an FPGA (Field Programmable Gate Array). In addition, an encoding device and a decoding device according to each embodiment presented below may be implemented by causing a computer to execute a program, in other words, by software. In description presented below, a term "image" may be appropriately replaced by a term such as a "video", a "pixel", an "image signal", a "picture", or "image data".

First Embodiment

In a first embodiment, an encoding device encoding a moving image will be described.

Figure 1:
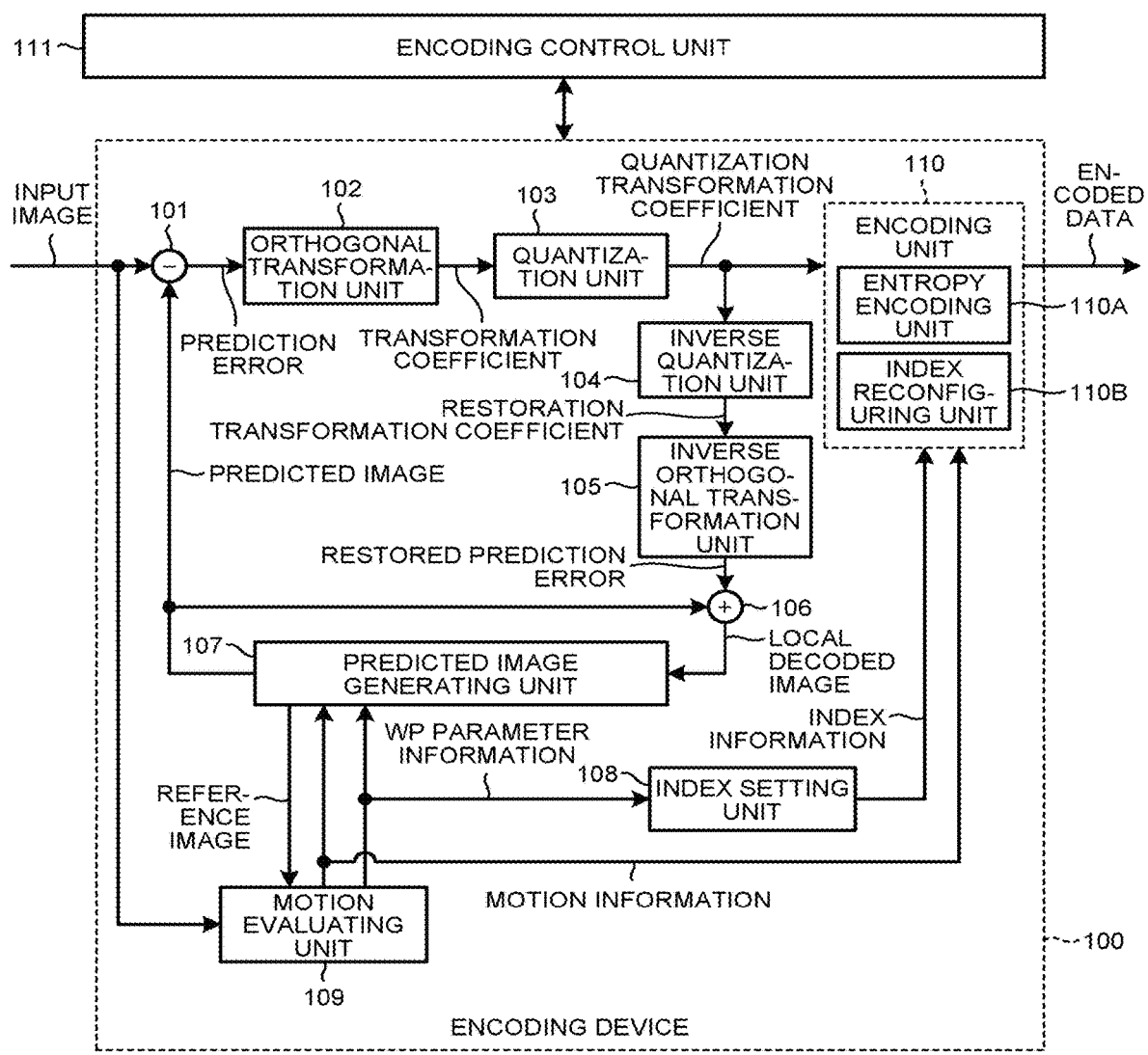
FIG. 1 is a block diagram that illustrates an example of an encoding device according to a first embodiment.

FIG. 1 is a block diagram that illustrates an example of the configuration of an encoding device 100 according to a first embodiment.

The encoding device 100 divides each frame or each field configuring an input image into a plurality of pixel blocks and performs predicted encoding of the divided pixel blocks using encoding parameters input from an encoding control unit 111, thereby generating a predicted image. Then, the encoding device 100 generates a prediction error by subtracting the predicted image from the input image divided into the plurality of pixel blocks, generates encoded data by performing orthogonal transformation, and quantization, and then entropy encoding for the generated prediction error, and outputs the generated encoded data.

The encoding device 100 performs predicted encoding by selectively applying a plurality of prediction modes that are different from each other in at least one of the block size of the pixel block and the method of generating a predicted image. The method of generating a predicted image can be largely divided into two types including an intra-prediction in which a prediction is made within an encoding target frame and an inter-prediction in which a motion-compensated prediction is made using one or more reference frames of different time points. The intra-prediction is also called an internal-screen prediction, an internal-frame prediction, or the like, and the inter-prediction is also called an inter-screen prediction, an inter-frame prediction, a motion-compensated prediction, or the like.

Figure 2A:
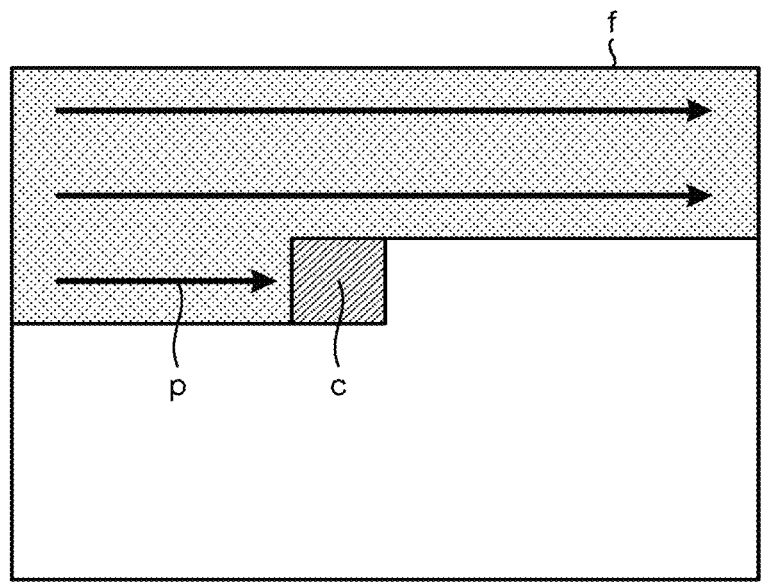
FIG. 2A is an explanatory diagram that illustrates an example of a predicted coding sequence for a pixel block according to the first embodiment.

FIG. 2A is an explanatory diagram that illustrates an example of a predicted coding sequence for a pixel block according to the first embodiment. In the example illustrated in FIG. 2A, the encoding device 100 performs prediction encoding from the upper left side toward the lower right side in the pixel block. Thus, in an encoding processing target frame f, on the left side and the upper side of the encoding target pixel block c, pixel blocks p that have been encoded are located.

Figure 2B:
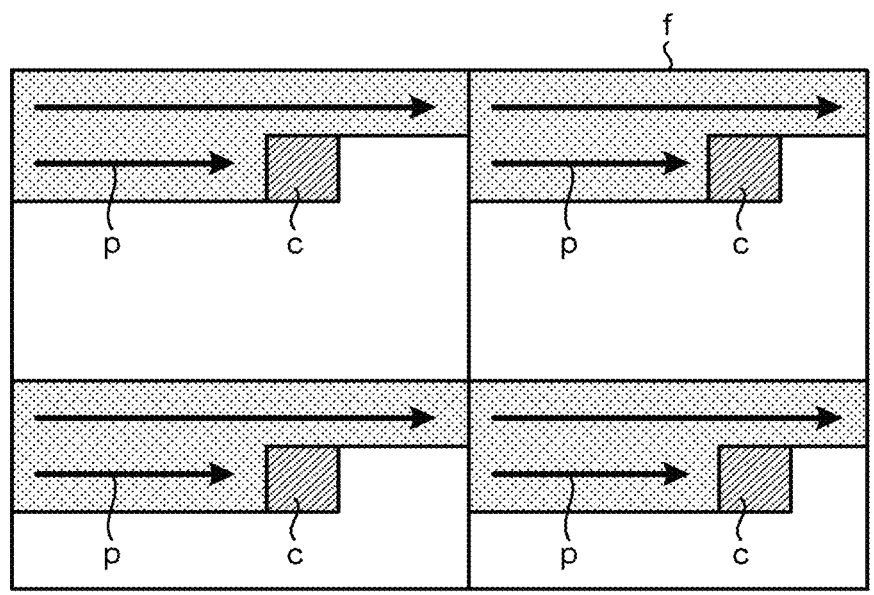
FIG. 2B is an explanatory diagram that illustrates another example of a predicted coding sequence for a pixel block according to the first embodiment.

FIG. 2B is an explanatory diagram that illustrates another example of a predicted coding sequence for a pixel block according to the first embodiment. In the example illustrated in FIG. 2B, the encoding device 100 divides a screen into a plurality of tile shapes or slice shapes, and then, performs predicted encoding from upper left side of a pixel block within each tile or each slice toward the lower right side. Accordingly, in an encoding processing target frame f, on the left side and the upper side of the encoding target pixel block c, pixel blocks p that have been encoded are located. Here, a tile represents an area acquired by cutting the screen into arbitrary rectangular areas, and a slice represents an area acquired by cutting the screen into an arbitrary number of large coding tree blocks to be described later in the prediction coding order.

In the example illustrated in FIG. 2B, after the screen is divided into a plurality of tile shapes or a plurality of slices, an encoding process is performed for each tile or each slice, and accordingly, a decoding process for each tile or each slice can be performed. Thus, by performing decoding processes of a high-resolution video in a parallel manner, the amount of calculation required for decoding can be divided. In other words, in the example illustrated in FIG. 2B, the encoding process and the decoding process can be performed at high speed.

Hereinafter, for the simplification of description, while it is assumed that the encoding device 100 performs prediction encoding in order illustrated in FIG. 2A, the order in the prediction encoding is not limited thereto.

The pixel block represents a unit for processing an image and, for example, a block having an M×N size (here, M and N are natural numbers), a coding tree block, a macro block, a sub-block, one pixel, or the like corresponds thereto. In description presented below, basically, the pixel block is used as the meaning of a coding tree block but may be used as a different meaning. For example, in description of a prediction unit, a pixel block is used as the meaning of a pixel block of the prediction unit. A block may be referred to as a unit or the like. For example, a coding block may be referred to as a coding unit.

Figure 3A:
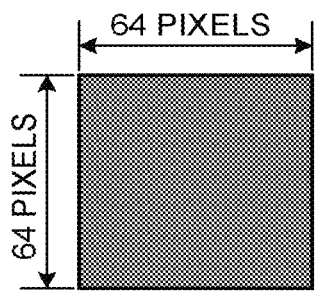
FIG. 3A is a diagram that illustrates an example of the size of a coding tree block according to the first embodiment.

FIG. 3A is a diagram that illustrates an example of the size of a coding tree block according to the first embodiment. The coding tree block, typically, is a pixel block of 64×64 as illustrated in FIG. 3A. However, the coding tree block is not limited thereto but may be a pixel block of 32×32, a pixel block of 16×16, a pixel block of 8×8, a pixel block of 4×4, or the like. Here, the coding tree block may not be a square but, for example, may be a pixel block of an M×N size (here, M≠N).

Figure 3B:
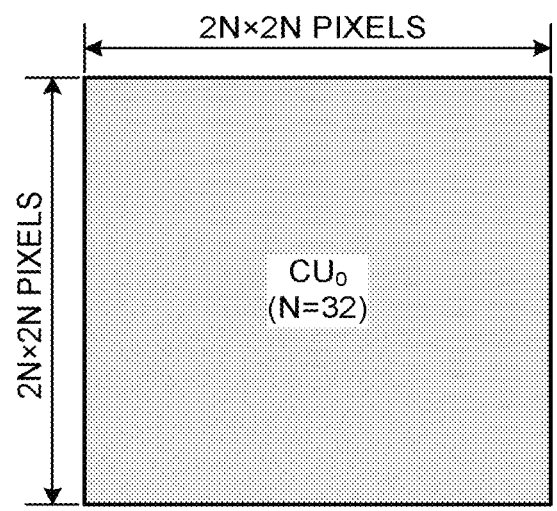
FIG. 3B is a diagram that illustrates a specific example of the coding tree block according to the first embodiment.
Figure 3C:
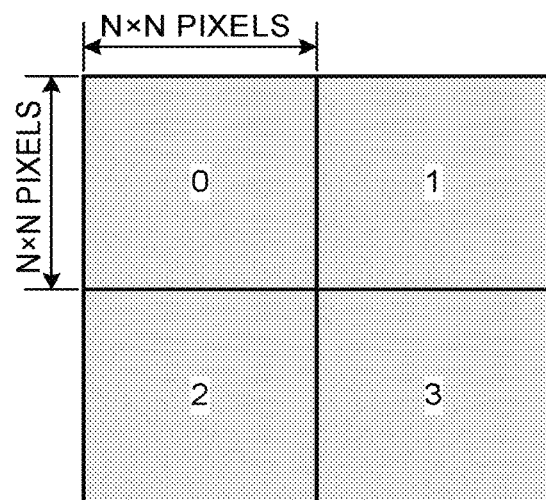
FIG. 3C is a diagram that illustrates another specific example of the coding tree block according to the first embodiment.
Figure 3D:
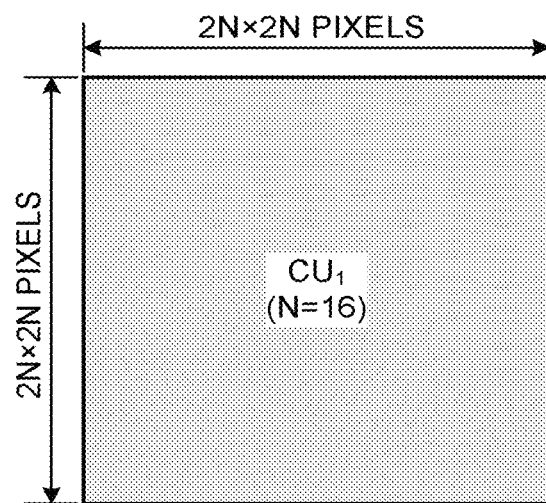
FIG. 3D is a diagram that illustrates another specific example of the coding tree block according to the first embodiment.

FIGS. 3B to 3D are diagrams representing specific examples of the coding tree block according to the first embodiment. FIG. 3B represents a coding tree block having a size of 64×64 (N=32). Here, N represents the size of a reference coding tree block. The size of a case where the coding tree block is divided is defined as N, and the size of a case where the coding tree block is not divided is defined as 2N. FIG. 3C represents a coding tree block acquired by dividing the coding tree block illustrated in FIG. 3B into a quadtree. The coding tree block, as illustrated in FIG. 3C, has a quadtree structure. In a case where the coding tree block is divided, as illustrated in FIG. 3C, numbers are attached to four pixel blocks after division in the Z scanning order.

In addition, within each number of the quadtree, the coding tree block may be further divided into a quadtree. Accordingly, the coding tree block may be divided in a hierarchical manner. In such a case, the depth of the division is defined as Depth. FIG. 3D represents one of the coding tree blocks acquired by dividing the coding tree block illustrated in FIG. 3B into a quadtree, and the block size thereof is 32×32 (N=16). The depth of the coding tree block illustrated in FIG. 3B is "0", and the depth of the coding tree block illustrated in FIG. 3D is "1". In addition, a coding tree block having a largest unit is called a large coding tree block, and an input image signal is encoded in such a unit in the raster scanning order.

In the description presented below, the encoded target block or the coding tree block of an input image may be referred to as a prediction target block or a prediction pixel block. In addition, the encoding unit is not limited to the pixel block, but at least one of a frame, a field, a slice, a line, and a pixel may be used as the encoding unit.

The encoding device 100, as illustrated in FIG. 1, includes: a subtraction unit 101; an orthogonal transformation unit 102; a quantization unit 103; an inverse quantization unit 104; an inverse orthogonal transformation unit 105; an addition unit 106; a predicted image generating unit 107; an index setting unit 108; a motion evaluating unit 109; and an encoding unit 110. In addition, the encoding control unit 111 illustrated in FIG. 1 controls the encoding device 100 and, for example, may be implemented by using a CPU (Central Processing Unit) or the like.

The subtraction unit 101 acquires a prediction error by subtracting a corresponding predicted image from an input image divided into pixel blocks. The subtraction unit 101 outputs the prediction error so as to be input to the orthogonal transformation unit 102.

The orthogonal transformation unit 102 performs an orthogonal transformation such as a discrete cosine transform (DCT) or a discrete sine transform (DST) for the prediction error input from the subtraction unit 101, thereby acquiring a transformation coefficient. The orthogonal transformation unit 102 outputs the transformation coefficient so as to be input to the quantization unit 103.

The quantization unit 103 performs a quantization process for the transformation coefficient input from the orthogonal transformation unit 102, thereby acquiring a quantization transformation coefficient. More specifically, the quantization unit 103 performs quantization based on a quantization parameter designated by the encoding control unit 111 and quantization information such as a quantization matrix. Described in more detail, the quantization unit 103 acquires the quantization transformation coefficient by dividing the transformation coefficient by a quantization step size derived based on the quantization information. The quantization parameter represents the fineness of the quantization. The quantization matrix is used for weighting the fineness of the quantization for each component of the transformation coefficient. The quantization unit 103 outputs the quantization transformation coefficient so as to be input to the inverse quantization unit 104 and the encoding unit 110.

The inverse quantization unit 104 performs an inverse quantization process for the quantization transformation coefficient input from the quantization unit 103, thereby acquiring a restoration transformation coefficient. More specifically, the inverse quantization unit 104 performs inverse quantization based on the quantization information used by the quantization unit 103. Described in detail, the inverse quantization unit 104 acquires a restoration transformation coefficient by multiplying the quantization transformation coefficient by the quantization step size derived based on the quantization information. In addition, the quantization information used by the quantization unit 103 is loaded from an internal memory, which is not illustrated in the figure, of the encoding control unit 111 and is used. The inverse quantization unit 104 outputs the restoration transformation coefficient so as to be input to the inverse orthogonal transformation unit 105.

The inverse orthogonal transformation unit 105 performs an inverse orthogonal transformation such as an inverse discrete cosine transform (IDCT) or an inverse discrete sine transform (IDST) for the restoration transformation coefficient input from the inverse quantization unit 104, thereby acquiring a restoration prediction error. Here, the inverse orthogonal transformation performed by the inverse orthogonal transformation unit 105 corresponds to an orthogonal transformation performed by the orthogonal transformation unit 102. The inverse orthogonal transformation unit 105 outputs the restoration prediction error so as to be input to the addition unit 106.

The addition unit 106 adds the restoration prediction error input from the inverse orthogonal transformation unit 105 and a corresponding predicted image, thereby generating a local decoded image. The addition unit 106 outputs the local decoded image so as to be input to the predicted image generating unit 107.

The predicted image generating unit 107 stores the local decoded image input from the addition unit 106 in a memory (not illustrated in FIG. 1) as a reference image and outputs the reference image stored in the memory so as to be input to the motion evaluating unit 109. In addition, the predicted image generating unit 107 generates a predicted image by performing a weighted motion-compensated prediction based on the motion information and WP parameter information input from the motion evaluating unit 109. The predicted image generating unit 107 outputs the predicted image so as to be input to the subtraction unit 101 and the addition unit 106.

Figure 4:
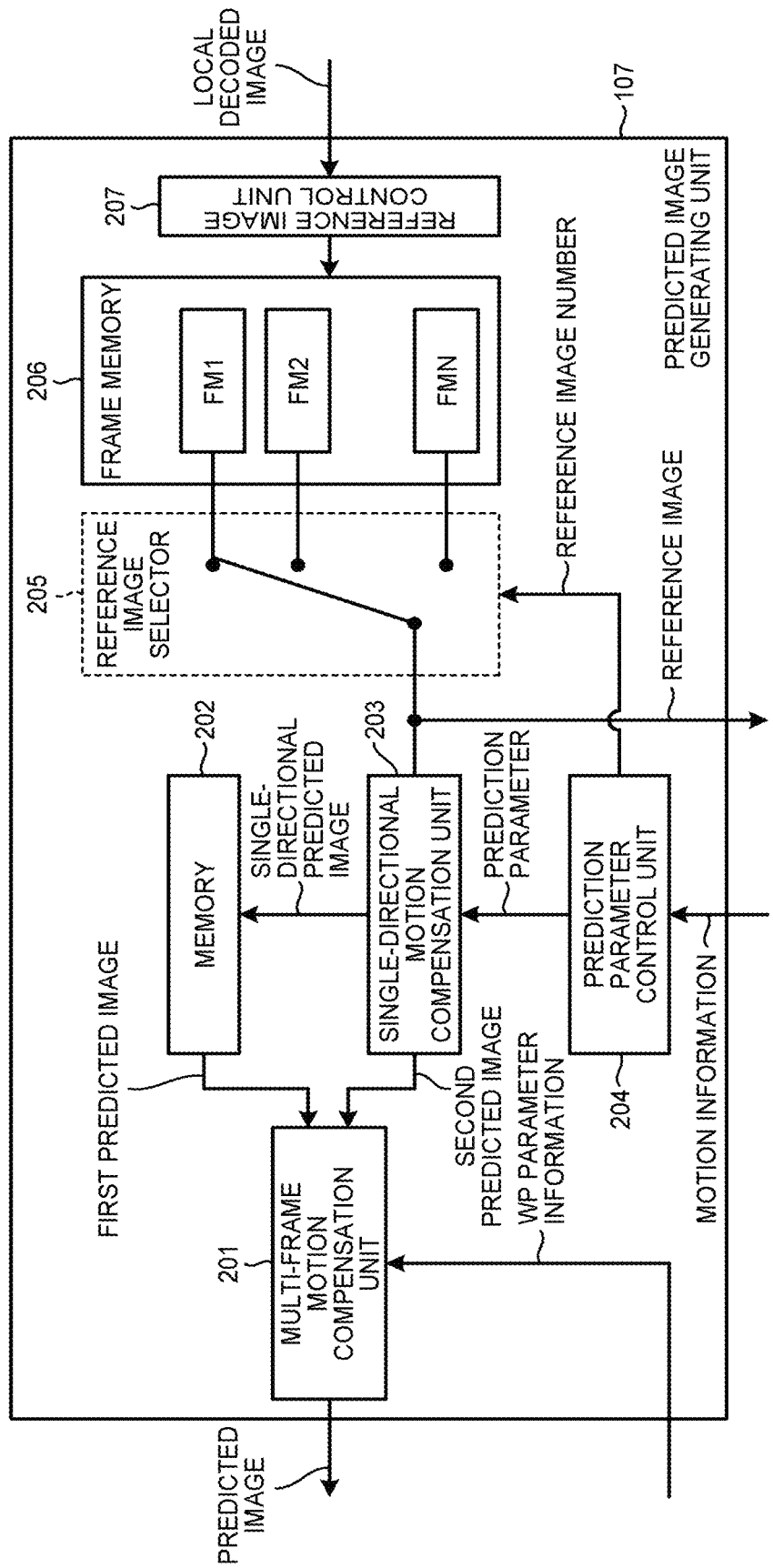
FIG. 4 is a block diagram that illustrates an example of a predicted image generating unit according to the first embodiment.

FIG. 4 is a block diagram that illustrates an example of the configuration of the predicted image generating unit 107 according to the first embodiment. The predicted image generating unit 107, as illustrated in FIG. 4, includes: a multi-frame motion compensation unit 201; a memory 202; a single-directional motion compensation unit 203; a prediction parameter control unit 204; a reference image selector 205; a frame memory 206; and a reference image control unit 207.

The frame memory 206 stores the local decoded image input from the addition unit 106 as a reference image under the control of the reference image control unit 207. The frame memory 206 includes a plurality of memory sets FM1 to FMN (here, N≥1) used for temporarily storing the reference image.

The prediction parameter control unit 204 prepares a plurality of combinations each of a reference image number and a prediction parameter as a table based on the motion information input from the motion evaluating unit 109. Here, the motion information represents information of a motion vector representing the deviation of a motion that is used for the motion-compensated prediction, the reference image number, and a prediction mode such as a single-directional/bidirectional prediction. The prediction parameter represents information relating to the motion vector and the prediction mode. Then, the prediction parameter control unit 204 selects a combination of a reference number and a prediction parameter used for generating a predicted image based on the input image and outputs the selected combination so as to allow the reference image number to be input to the reference image selector 205 and allow the prediction parameter to be input to the single-directional motion compensation unit 203.

The reference image selector 205 is a switch that changes one of output terminals of the frame memories FM1 to FMN, which are included in the frame memory 206, to be switched to based on a reference image number input from the prediction parameter control unit 204. For example, when the reference image number is "0", the reference image selector 205 connects the output terminal of the frame memory FM1 to the output terminal of the reference image selector 205, and, when the reference image number is N−1, the reference image selector 205 connects the output terminal of the frame memory FMN to the output terminal of the reference image selector 205. The reference image selector 205 outputs a reference image stored in the frame memory of which the output terminal is connected thereto from among the frame memories FM1 to FMN included in the frame memory 206 so as to be input to the single-directional motion compensation unit 203 and the motion evaluating unit 109.

The single-directional motion compensation unit 203 performs a motion-compensated prediction process based on the prediction parameter input from the prediction parameter control unit 204 and the reference image input from the reference image selector 205, thereby generating a single-directional predicted image.

Figure 5:
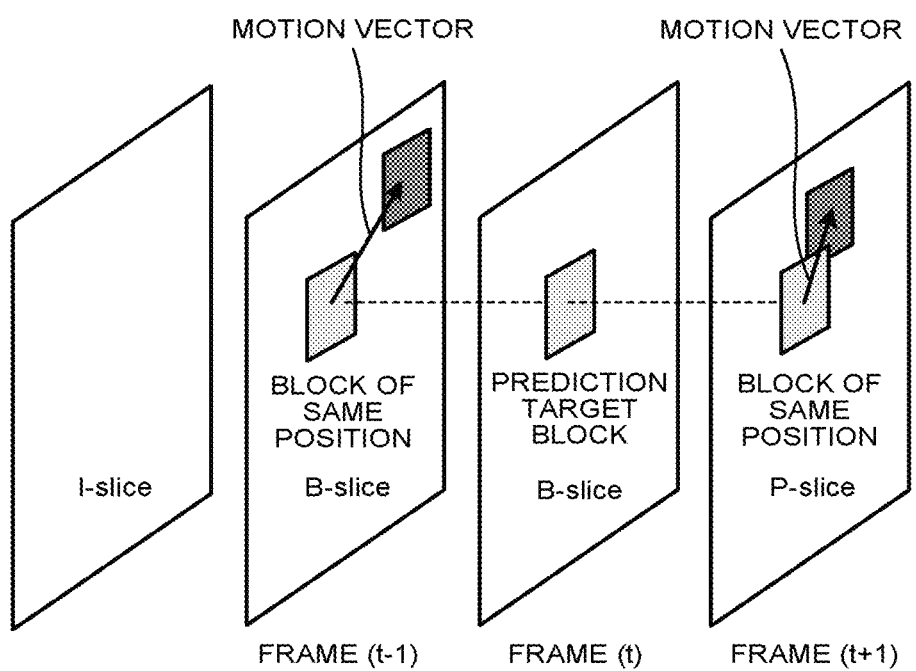
FIG. 5 is a diagram that illustrates an example of the relation between motion vectors for a motion-compensated prediction in a bidirectional prediction according to the first embodiment.

FIG. 5 is a diagram that illustrates an example of the relation between motion vectors for a motion-compensated prediction in a bidirectional prediction according to the first embodiment. In the motion-compensated prediction, an interpolation process is performed using the reference image, and a single-directional predicted image is generated based on deviations of motions of the generated interpolated image and the input image from the pixel block located at the encoding target position. Here, the deviation is a motion vector. As illustrated in FIG. 5, in the bidirectional prediction slice (B-slice), a predicted image is generated by using two types of reference images and a motion vector set. As the interpolation process, an interpolation process of ½-pixel precision, an interpolation process of ¼-pixel precision, or the like is used, and, by performing a filtering process for the reference image, a value of the interpolated image is generated. For example, in H.264 in which an interpolation up to ¼-pixel precision can be performed for a luminance signal, the deviation is represented as four times integer pixel precision.

The single-directional motion compensation unit 203 outputs a single-directional predicted image and temporarily stores the single-directional predicted image in the memory 202. Here, in a case where the motion information (prediction parameter) represents a bi-directional prediction, the multi-frame motion compensation unit 201 makes a weighted prediction using two types of single-directional predicted images. Accordingly, the single-directional motion compensation unit 203 stores a single-directional predicted image corresponding to the first type in the single-directional predicted image in the memory 202 and directly outputs a single-directional predicted image corresponding to the second type to the multi-frame motion compensation unit 201. Here, the single-directional predicted image corresponding to the first type will be referred to as a first predicted image, and the single-directional predicted image corresponding to the second type will be referred to as a second predicted image.

In addition, two single-directional motion compensation units 203 may be prepared and generate two single-directional predicted images. In such a case, when the motion information (prediction parameter) represents a single-directional prediction, the single-directional motion compensation unit 203 may directly output the first single-directional predicted image to the multi-frame motion compensation unit 201 as a first predicted image.

The multi-frame motion compensation unit 201 makes a weighted prediction by using the first predicted image input from the memory 202, the second predicted image input from the single-directional motion compensation unit 203, and the WP parameter information input from the motion evaluating unit 109, thereby generating a predicted image. The multi-frame motion compensation unit 201 outputs the predicted image so as to be input to the subtraction unit 101 and the addition unit 106.

Figure 6:
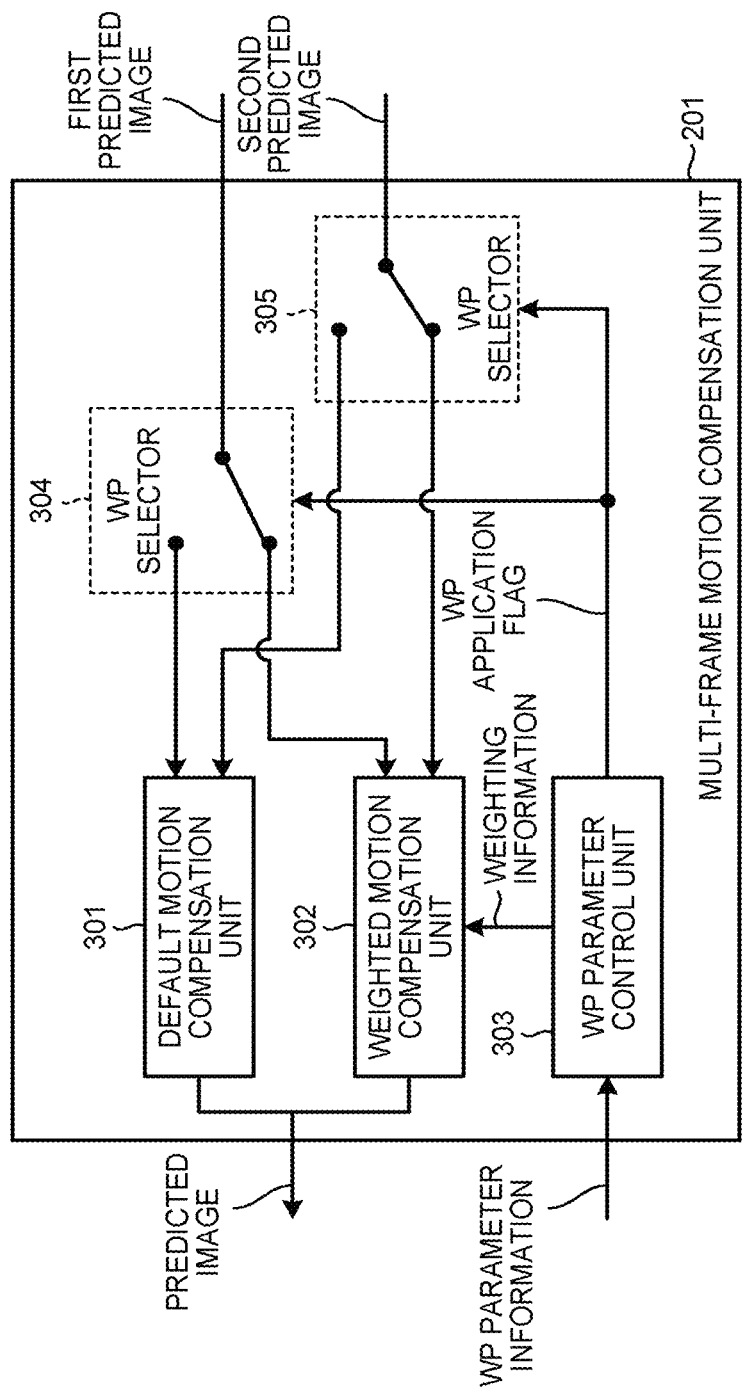
FIG. 6 is a block diagram that illustrates an example of a multi-frame motion compensation unit according to the first embodiment.

FIG. 6 is a block diagram that illustrates an example of the configuration of the multi-frame motion compensation unit 201 according to the first embodiment. As illustrated in FIG. 6, the multi-frame motion compensation unit 201 includes: a default motion compensation unit 301; a weighted motion compensation unit 302; a WP parameter control unit 303; and WP selectors 304 and 305.

The WP parameter control unit 303 outputs a WP application flag and weighting information based on the WP parameter information input from the motion evaluating unit 109 so as to input the WP application flag to the WP selectors 304 and 305 and input the weighting information to the weighted motion compensation unit 302.

Here, the WP parameter information includes a first WP application flag (described in more details, flag information of a first WP application flag), a second WP application flag (described in more details, flag information of a second WP application flag), and information of weighting information. The first WP application flag and the second WP application flag are parameters that can be set for each reference image and each signal component and include information of whether a default motion-compensated prediction is made or a weighted motion-compensated prediction is made for the first predicted image and the second predicted image. Here, in a case where the first WP application flag and the second WP application flag are respectively "0", it represents that default motion-compensated predictions are made. On the other hand, in a case where the first WP application flag and the second WP application flag are respectively "1", it represents that weighted motion-compensated predictions are made.

The weighting information includes information of a value $w_{0C}$ of the first weighting factor, a value $w_{1C}$ of the second weighting factor, a parameter LWD (here, it may be referred to as "fixed point precision LWD") representing the fixed point precision of the first and second weighting factors, a first offset $o_{0C}$, and a second offset $o_{1C}$. Here, the variable C represents a signal component. For example, in the case of a YUV spatial signal, a luminance signal is represented by C=Y, a Cr color difference signal is represented by C=Cr, and a Cb color difference component is represented by C=Cb.

The first weighting factor is a weighting factor corresponding to the first predicted image and is a parameter having a value determined (changed) in accordance with the fixed point precision LWD. The second weighting factor is a weighting factor corresponding to the second predicted image and is a parameter having a value determined (changed) in accordance with the fixed point precision LWD. The fixed point precision LWD is a parameter that controls an interval width corresponding to fractional precision of the second weighting factor. While different values of the fixed point precision LWD may be used in accordance with the luminance and the color difference, here, for the simplification of description, the fixed point precision will be described without being explicitly divided for each color signal. For example, in a case where when $w_{0C}$ is 1.0 (1 in the binary notation), when being represented as a real value, and LWD is 5, the first weighting factor is 32 (100000 in the binary notation). In addition, in a case where when $w_{1C}$ is 2.0 (10 in the binary notation), when being represented as a real value, and LWD is 5, the second weighting factor is 64 (1000000 in the binary notation). The first offset $o_{0C}$ is an offset corresponding to the first predicted image, and the second offset $o_{1C}$ is an offset corresponding to the second predicted image.

In addition, when WP parameter information is input, the WP parameter control unit 303 checks whether a value of the weighting information is within a prescribed range and resets the value, which is out of the range, to a value within the range or changes the value of the WP application flag. For example, in a case where $w_{0C}$ is 3.0, when being represented as a real value, and LWD is 7, the first weighting factor is 384. Here, it is assumed that 384 is out of the range of the first weighting factor and cannot be used, and 96 is within the range of the first weighting factor and can be used. In such a case, the WP parameter control unit 303 may reset the first weighting factor to be within the range of the first weighting factor by setting LWD to 5 and setting the first weighting factor to 96 with $w_{0C}$ being maintained to be 3.0 when represented as a real value. In addition, at that time, the WP parameter control unit 303 may perform a quantization process. For example, in a case where LWD is 7, and the first weighting factor is 385, the WP parameter control unit 303 may resetting the first weighting factor to 96 by setting the first weighting factor to 384 by performing a quantization process and then setting LWD to 5 and $w_{0C}$ to 3.0 when being represented as a real value. In addition, the WP parameter control unit 303 may changes the value of the first WP application flag from 1 to 0, thereby a weighted motion-compensated prediction is not used. While the technique is not limited thereto, the WP parameter control unit 303 performs control such that the value of the weighting information does not exceed the prescribed range determined based on the specifications and the like.

The WP selectors 304 and 305 change the connection ends of the predicted images based on the WP application flags input from the WP parameter control unit 303. In a case where the corresponding WP application flag is "0", each one of the WP selectors 304 and 305 connects the output end thereof to the default motion compensation unit 301. Then, the WP selectors 304 and 305 output the first and second predicted images so as to be input to the default motion compensation unit 301. On the other hand, in a case where the corresponding WP application flag is "1", each one of the WP selectors 304 and 305 connects the output end thereof to the weighted motion compensation unit 302. Then, the WP selectors 304 and 305 output the first and second predicted images so as to be input to the weighted motion compensation unit 302.

The default motion compensation unit 301 performs average processing (default motion-compensated prediction) based on the two single-directional predicted images (the first and second predicted images) input from the WP selectors 304 and 305, thereby generating a predicted image. More specifically, in a case where the first and second WP application flags are "0", the default motion compensation unit 301 performs average processing based on Numerical Expression (1).

$$P[x,y]=\text{Clip1}((PL0[x,y]+PL1[x,y]+\text{offset2})>>(\text{shift2})) \quad (1)$$

Here, P[x, y] is a predicted image, PL0[x, y] is a first predicted image, and PL1[x, y] is a second predicted image. In addition, offset2 and shift2 are parameters of a rounding process in the average processing and are determined based on the internal calculation precision of the first and second predicted images. Clip1(X) is a function for clipping a variable X with specific bit precision and, here, clips the variable X within the bit precision of a predicted image. For example, when the bit precision L of a predicted image is 8, a value out of the range of 0 to 255 is clipped to 0 to 255. Described in more detail, a value that is 0 or less is set to 0, and a value that is more than 255 is set to 255.

When the bit precision of the predicted image is L, and the bit precision of the first and second predicted images is M (L≥M), shift2 is formulated by Numerical Expression (2), and offset2 is formulated by Numerical Expression (3).

$$\text{shift2}=(M-L+1) \quad (2)$$

$$\text{offset2}=(1<<(\text{shift2}-1) \quad (3)$$

For example, the bit precision of the predicted image is "8", and the bit precision of the first and second predicted images is "14", shift2=7 based on Numerical Expression (2), and offset2=(1<<6) based on Numerical Expression (3).

In addition, in a case where the prediction mode represented by the motion information (prediction parameter) is the single-directional prediction, the default motion compensation unit 301 calculates a final predicted image using only the first predicted image based on Numerical Expression (4).

$$P[x,y]=\text{Clip1}((PLX[x,y]+\text{offset1})>>(\text{shift1})) \quad (4)$$

Here, PLX[x, y] represents a single-directional predicted image (first predicted image), and X is an identifier representing either "0" or "1" as a reference list. For example, PLX[x,y] is PL0[x,y] in a case where the reference list is "0" and is PL1[x,y] in a case where the reference list is "1". In addition, offset1 and shift1 are parameters for a rounding process and are determined based on the internal calculation precision of the first predicted image. When the bit precision of the predicted image is L, and the bit precision of the first predicted image is M, shift1 is formulated by Numerical Expression (5), and offset1 is formulated by Numerical Expression (6).

$$\text{shift1}=(M-L) \quad (5)$$

$$\text{offset1}=(1<<(\text{shift1}-1)) \quad (6)$$

For example, in a case where the bit precision of the predicted image is "8", and the bit precision of the first predicted image is "14", shift1=6 based on Numerical Expression (5), and offset1=(1<<5) based on Numerical Expression (6).

The weighted motion compensation unit 302 performs weighted motion compensation (weighted motion-compensated prediction) based on the two single-directional predicted images (the first and second predicted images) input from the WP selectors 304 and 305 and the weighting information input from the WP parameter control unit 303.

Figure 7:
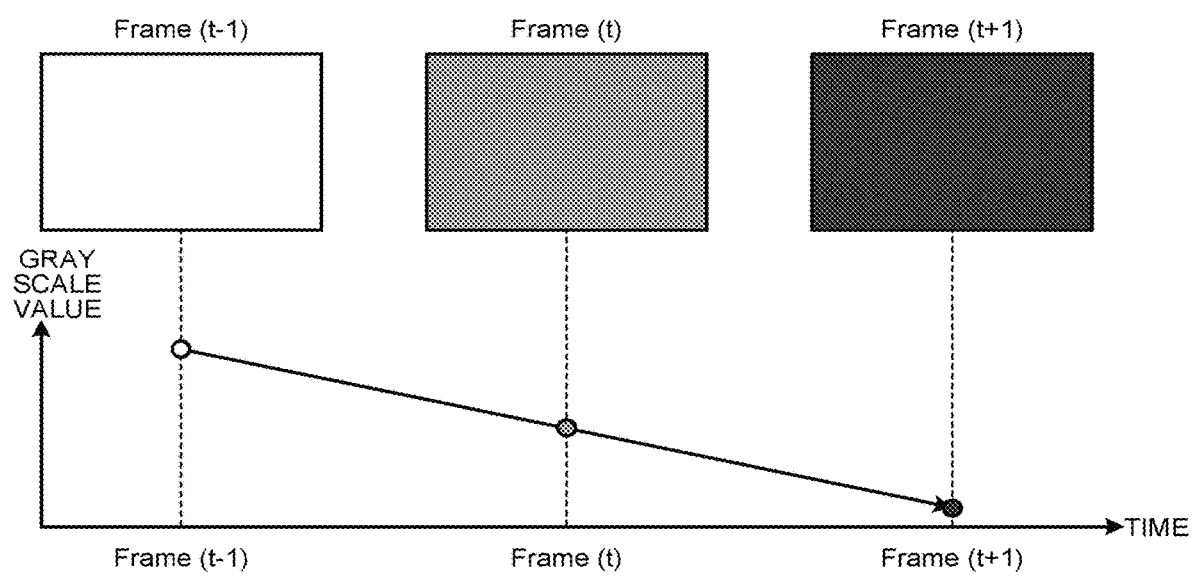
FIG. 7 is a reference diagram that illustrates weighting factors.

Here, the weighting factor will be further described. FIG. 7 is a reference diagram for describing the weighting factor and illustrates an example of a change in the gray scale of a moving image having a pixel value change in the time direction. In the example illustrated in FIG. 7, an encoding target frame is Frame(t), a frame that is one frame before the encoding target frame in time is Frame(t−1), and a frame that is one frame after the encoding target frame in time is Frame(t+1). As illustrated in FIG. 7, in a fading image changing from white to black, the brightness (gray scale value) of the image decreases in accordance with the elapse of time. The value of the weighting factor represents the degree of change in the pixel value as described with reference to FIG. 7 and takes a value of "1.0" in a case where there is no change in the pixel value (in a case where a change in the pixel value is "0") when represented as a real value.

Here, a case will be described in which there is no change in the pixel value. For example, in a case where a moving image in which the same still image is continuous in time is considered, a change between screens in the luminance is zero. In such a case, since a change in the pixel value is zero even when a weighted motion-compensated prediction is made, the case is equivalent to a case where the weighted motion compensation unit 302 makes a default motion-compensated prediction. In such a case, in other words, in a case where there is no change in the pixel value, the weighted motion compensation unit 302 selects a reference value of the weighting factor, whereby the default motion-compensated prediction is realized as a weighted motion-compensated prediction. Here, the reference value of the weighting factor can be derived based on the fixed point precision (1<<LWD).

Generally, a change in the pixel value of a moving image such as a fading effect, a dissolving effect, or the like is not that much for each frame, and accordingly, the value of the weighting factor is inclined toward 1.0 when represented as a real value. In addition, in the first embodiment, since the value of the weighting factor is quantized with fixed point precision represented as a power of 2, even when there is only an average change between two images in the pixel value, in the case of a change with $1/128$ precision or less, the value of the weighting factor is quantized to 1/0 when represented as a real value. Accordingly, in the first embodiment, even in a case where a change in the pixel value occurs, the case can be treated as a case where there is substantially no change in the pixel value. Hereinafter, for the simplification of description, the description will be presented with assuming a case where there is no change in the pixel value, in other words, a case where the value of the weighting factor is 1.0 when represented as a real value. In addition, a case where there is no change in the pixel value corresponds to a case where a change in the pixel value is a predetermined value (a value that is sufficiently smaller than the precision of the weighting factor) or less.

Accordingly, in a case where the first WP application flag and the second WP application flag are "1", the weighted motion compensation unit 302 performs a weighting process based on Numerical Expression (7).

$$P[x,y]=\text{Clip1}(((PL0[x,y]*w_{0C}+PL1[x,y]*w_{1C}+ \\ ((o_{0C}+o_{1C}+1)<<LWD))>>(LWD+1))) \quad (7)$$

In addition, in a case where the calculation precision of the first and second predicted images and the calculation precision of the predicted image are different from each other, the weighted motion compensation unit 302 realizes a rounding process by controlling LWD as in Numerical Expression (8).

$$LWD'=LWD+\text{offset1} \quad (8)$$

The rounding process can be realized by substituting LWD represented in Numerical Expression (7) with LWD' represented in Numerical Expression (8). For example, in a case where the bit precision of the predicted image is 8, and the bit precision of the first and second predicted images is 14, by resetting LWD, a batch rounding process having the same calculation precision as that of shift2 represented in Numerical Expression (1) can be realized.

In addition, in a case where the prediction mode represented by the motion information (prediction parameter) is a single directional prediction, the weighted motion compensation unit 302 calculates a final predicted image using only the first predicted image based on Numerical Expression (9).

$$P[x,y]=\text{Clip1}((PLX[x,y]*w_{XC}+(1<<(LWD-1)))>> \\ (LWD)+o_{XC}) \quad (9)$$

Here, PLX[x, y] represents a single-directional predicted image (first predicted image), $w_{XC}$ represents a weighting factor corresponding to a single directional prediction, X is an identifier representing either "0" or "1" as a reference list, and $o_{XC}$ represents an offset corresponding to a single-directional prediction. For example, PLX[x, y], $w_{XC}$, and the offset are PL0[x,y], $w_{0C}$, and $o_{0C}$ in a case where the reference list is "0" and are PL1[x, y], $w_{1C}$, and $o_{1C}$ in a case where the reference list is "1".

In addition, in a case where the calculation precision of the first and second predicted images and the calculation precision of the predicted image are different from each other, the weighted motion compensation unit 302 realizes a rounding process by controlling LWD, as in Numerical Expression (8), similarly to the case of the bi-directional prediction.

The rounding process can be realized by replacing LWD represented in Numerical Expression (9) with LWD' represented in Numerical Expression (8). For example, in a case where the bit precision of the predicted image is "8", and the bit precision of the first predicted image is "14", by resetting LWD, it is possible to realize a batch rounding process for the calculation precision similar to that of shift1 represented in Numerical Expression (4).

In addition, in the case of a single directional prediction, various parameters (the second WP application flag, the second weighting factor, and the second offset information) corresponding to the second predicted image are not used and may be set to initial values determined in advance.

Referring back to FIG. 1, the motion evaluating unit 109 performs a motion evaluation between a plurality of frames based on an input image and a reference image input from the predicted image generating unit 107 and outputs the motion information and the WP parameter information, thereby inputting the motion information to the predicted image generating unit 107 and the encoding unit 110 and inputting the WP parameter information to the predicted image generating unit 107 and the index setting unit 108.

The motion evaluating unit 109 calculates an error, for example, by calculating differences between an input image of a prediction target pixel block and a plurality of reference images corresponding to the same position as a starting point, shifts the position with fractional precision, and calculates optimal motion information using a technique such as block matching for finding a block of a minimal error or the like. In the case of a bi-directional prediction, the motion evaluating unit 109 performs block matching including a default motion compensation prediction as represented in Numerical Expressions (1) and (4) using the motion information derived from the single-directional prediction, thereby calculating motion information of the bidirectional prediction.

At this time, the motion evaluating unit 109 can calculate the WP parameter information by performing block matching including a weighted motion compensation prediction as represented in Numerical Expressions (7) and (9). In addition, for the calculation of the WP parameter information, a method of calculating a weighting factor or an offset using a pixel gradient of the input image, a method of calculating a weighting factor or an offset in accordance with the accumulation of a prediction error at the time of encoding, or the like may be used. Furthermore, as the WP parameter information, a fixed value determined in advance for each encoding device may be used.

Here, a method of calculating a weighting factor, the fixed point precision of the weighting factor, and an offset from a moving image having a pixel value change in time will be described by referring back to FIG. 7. As described above, in the fading image changing from white to black as illustrated in FIG. 7, the pixel value (gray scale value) decreases in accordance with the elapse of time. The motion evaluating unit 109 can calculate the weighting factor by calculating the slope thereof.

The fixed point precision of the weighting factor is information representing the precision of the slope, and the motion evaluating unit 109 can calculate an optimal value based on a distance to the reference image in time and the degree of change of the image value. For example, in FIG. 7, in a case where the value of the weighting factor between Frame(t−1) and Frame(t+1) is 0.75 when represented with real-value precision, ¾ can be represented in the case of ¼ precision, and accordingly, the motion evaluating unit 109 sets the fixed point precision to 2 (1<<2). Since the value of the fixed point precision influences on the code amount of a case where the weighting factor is encoded, as the value of the fixed point precision, an optimal value may be selected in consideration of the code amount and the prediction precision. In addition, the value of the fixed point precision may be a fixed value determined in advance.

In addition, in a case where the slope is not matched, the motion evaluating unit 109 can calculate the value of the offset by acquiring a correction value (deviation amount) corresponding to the intercept of the linear function. For example, in FIG. 7, in a case where a weighting factor between Frame(t−1) and Frame(t+1) is 0.60 when represented with real precision, and the fixed point precision is "1" (1<<1), there is a high possibility that the weighting factor is set to "1" (corresponding to 0.50 when the value of the weighting factor is represented with real precision). In such a case, since the fractional precision of the weighting factor deviates from 0.60, which is an optimal value, by 0.10, the motion evaluating unit 109 calculates a correction value corresponding thereto based on a maximum value of the pixel and sets the correction value as the value of the offset. In a case where the maximum value of the pixel is 255, the motion evaluating unit 109 may set a value such as 25 (255×0.1).

In the first embodiment, although the motion evaluating unit 109 is represented as one function of the encoding device 100 as an example, the motion evaluating unit 109 is not an essential configuration of the encoding device 100, and, for example, the motion evaluating unit 109 may be a device other than the encoding device 100. In such a case, the motion information and the WP parameter information calculated by the motion evaluating unit 109 may be loaded into the encoding device 100.

The index setting unit 108 receives the WP parameter information input from the motion evaluating unit 109, checks a reference list (list number) and a reference image (reference number), and outputs index information so as to be input to the encoding unit 110. The index setting unit 108 generates the index information by mapping the WP parameter information input from the motion evaluating unit 109 into a syntax element to be described later. At this time the index setting unit 108 derives a selection range of the weighting factor and checks that the weighting factor is included in the selection range.

Here, the deriving of the selection range of the weighting factor will be described.

In the first embodiment, as described above, a case is assumed in which there is no change in the pixel value, and the value of the weighting factor is 1.0 when represented as a real value. In such a case, it is satisfied that the weighting factor/the reference value of the weighting factor=1. As described above, since the reference value of the weighting factor is (1<<LWD), the weighting factor is (1<<LWD) and has the same value as the reference value of the weighting factor in the first embodiment.

By the way, in H.264 and the like, each index of the weighting factor, the offset, or the like is defined to take a value of signed 8 bits of −128 to 127, and the fixed point precision is defined to take a value of 0 to 7. Thus, according to the first embodiment, there are cases where the weighting factor is out of the defined range.

Figure 8:
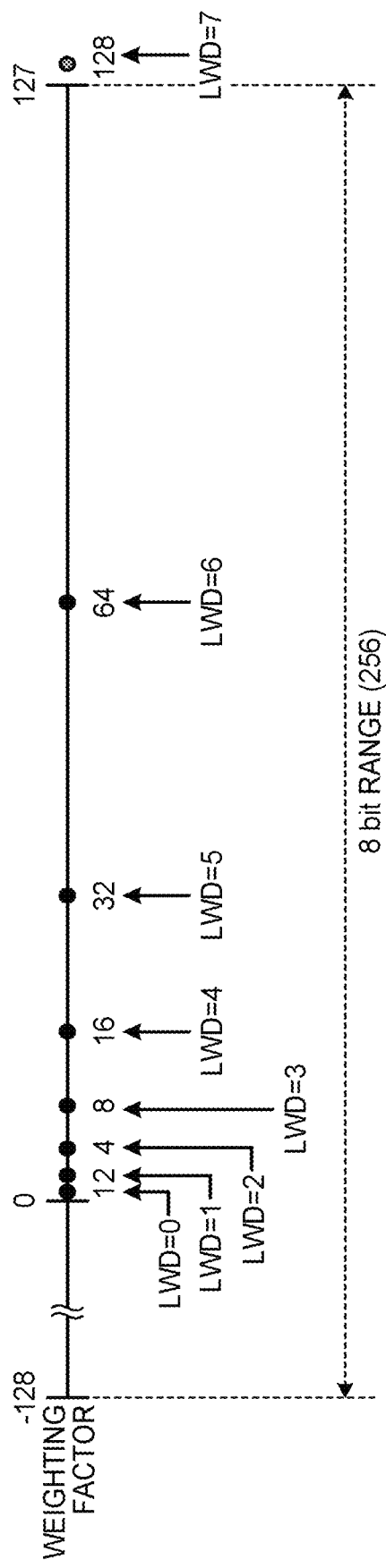
FIG. 8 is a reference diagram that illustrates a selection range of a weighting factor of H.264.

FIG. 8 is a reference diagram that illustrates the selection range of a weighting factor of H.264 and represents weighting factors (1<<LWD) of a case where the fixed point precision LWD takes values from 0 to 7. As is apparent from FIG. 8, the weighting factor takes a positive value near zero as the value of the fixed point precision LWD decreases.

However, when the value of the fixed point precision LWD is 7, the weighting factor is 128, which is out of the range defined in H.264.

As above, in the regulation of H.264, the range of the weighting factor desired to be used is out of the regulated range, which is not obedient to practical applications. In addition, in a single-directional prediction, even when a weighting factor corresponding to the negative direction is selected, there is a high possibility that a predicted pixel value output by the single-directional prediction may be clipped to be zero based on the clipping range of an input image, and a weighting factor corresponding to the negative direction cannot be substantially selected. On the other hand, in a bi-directional prediction, in order to realize an external insertion prediction, a use method may be employed in which the weighting factor of the single-directional prediction on one side is set to a negative value, and the weighting factor on the other side is set to a positive value. However, there are many cases where a negative-side value does not require the same precision as that of a positive-side value as the range of the weighting factor.

For this reason, according to the first embodiment, the index setting unit 108 derives a selection range of the weighting factor by assigning values in the negative and positive directions with the reference value of the weighting factor being set as approximate center and checks that the weighting factor is included in the derived selection range of the weighting factor.

Figure 9:
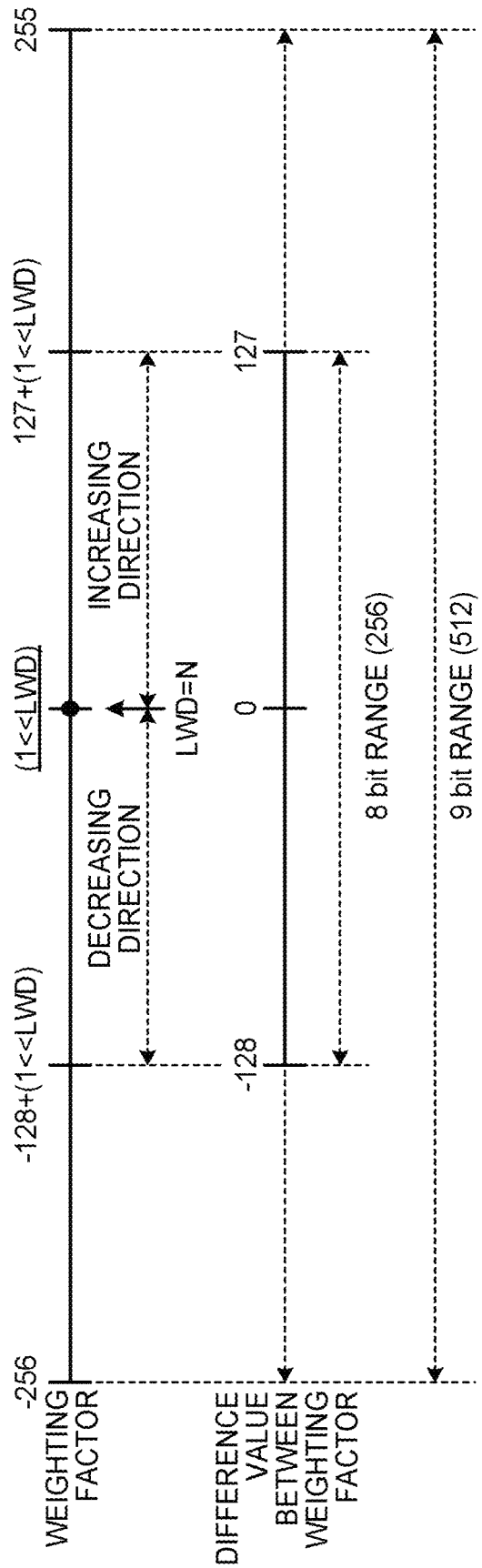
FIG. 9 is an explanatory diagram that illustrates an example of a selection range of the weighting factor according to the first embodiment.

FIG. 9 is an explanatory diagram that illustrates an example of the selection range of the weighting factor according to the first embodiment. In the example illustrated in FIG. 9, differently from the selection range of the weighting factor described with reference to FIG. 8, the reference value (1<<LWD) of the weighting factor is arranged so as to be positioned at approximate center of the selection range, a value (−128+(1<<LWD)) acquired by subtracting 128 from the reference value of the weighting factor is a minimum value of the selection range, and a value (127+(1<<LWD)) acquired by adding 127 to the reference of the weighting factor is a maximum value of the selection range.

The index setting unit 108 sets a selection range of the weighting factor by using Numerical Expressions (10) and (11). A minimum value of the selection range is formulated by Numerical Expression (10), and a maximum value of the selection range is formulated by using Numerical Expression (11).

$$\min\_w_{XC} = -128 + (1 << LWD) \quad (10)$$

$$\max\_w_{XC} = 127 + (1 << LWD) \quad (11)$$

Figure 10B:
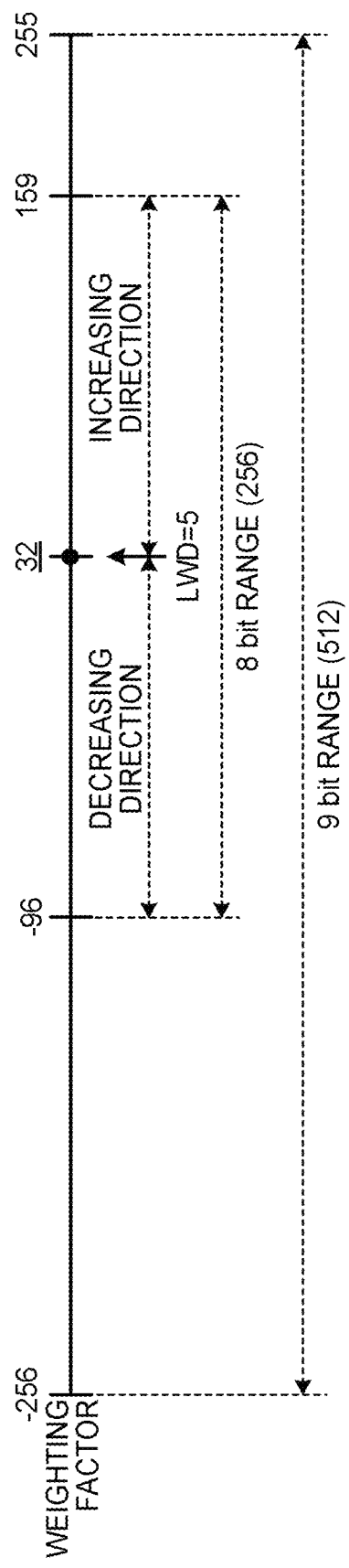
FIG. 10B is an explanatory diagram that illustrates another specific example of the selection range of the weighting factor according to the first embodiment.

FIGS. 10A and 10B are explanatory diagrams that illustrate specific examples of the selection range of the weighting factor according to the first embodiment. FIG. 10A illustrates the selection range of the weighting factor of a case where the value of the fixed point precision LWD is 7, and FIG. 10B illustrates the selection range of the weighting factor of a case where the value of the fixed point precision LWD is 5. In the example illustrated in FIG. 10A, the reference value of the weighting factor, which is "128", is arranged so as to be positioned at approximate center of the selection range, a minimum value of the selection range is 0, and a maximum value of the selection range is 255. In the example illustrated in FIG. 10B, the reference value of the weighting factor, which is "32", is arranged so as to be positioned at approximate center of the selection range, a minimum value of the selection range is −96, and a maximum value of the selection range is 159.

FIG. 11 is a reference diagram that illustrates a minimum value and a maximum value of the selection range of the weighting factor of H.264. FIG. 12 is an explanatory diagram that illustrates an example of the minimum value and the maximum value of the selection range of the weighting factor according to the first embodiment. As illustrated in FIG. 11, in H.264, a minimum value and a maximum value of the selection range of the weighting factor are constant regardless of the reference value of the weighting factor. On the other hand, as illustrated in FIG. 12, according to the first embodiment, a minimum value and a maximum value of the selection range of the weighting factor change depending on the reference value of the weighting factor.

As illustrated in FIG. 12, in a case where the selection range of the weighting factor is set with the reference value of the weighting factor being the approximate center thereof, the range taken by the weighting factor is −127 to 255, and precision of signed 9 bits is required. For this reason, in the first embodiment, the encoding unit 110 to be described later updates a weighting factor set as an index, in other words, a value of the encoding target to a difference value between the weighting factor and the reference value of the weighting factor. As illustrated in FIG. 9, it can be understood, by subtracting the reference value of the weighting factor from the derived selection range of the weighting factor, the range of the difference value between the weighting factors takes a signed 8-bit value of −128 to 127. In other words, while the selection range of the weighting factor changes depending on the reference value of the weighting factor in a case where the selection range of the weighting factor is set with the reference value of the weighting factor being the approximate center thereof, by subtracting the reference value of the weighting factor from the selection range of the weighting factor, the range of a difference value between the weighting factors is constant regardless of the reference value of the weighting factor. As above, according to the first embodiment, since the weighting factor is replaced with the difference value between the weighting factors, the selection range of the weighting factor expands, and the selection range having singed 8-bit precision can be defined.

In addition, in a case where it is checked that the weighting factor is not included in the derived selection range of the weighting factor, the index setting unit 108 may perform a clipping process using a maximum value or a minimum value of the selection range of the weighting factor. In such a case, the index setting unit 108 may clip the weighting factor to the minimum value in a case where the weighting factor is less than the minimum value of the selection range and clip the weighting factor to the maximum value in a case where the weighting factor is more than the maximum value of the selection range. By introducing such a clipping process, the value of the encoding target such as the difference value between the weighting factors takes a value within the predetermined bit precision without arranging a specific range restriction, and accordingly, the configuration of the circuit scale used by the hardware can be clarified.

Furthermore, in the first embodiment, although a case is assumed in which the selection range of the weighting factor has signed 8-bit precision, the precision of the selection range of the weighting factor is not limited thereto and, for example, may be signed 9-bit precision. In such a case, while the selection range of the weighting factor is −256 to 255, −128 represented in Numerical Expression (10) may be replaced with −256, and 127 represented in Numerical Expression (11) may be replaced with 255.

In addition, in the first embodiment, although an example has been described in which the selection range of the weighting factor is derived by the index setting unit 108, the deriving of the selection range is not limited thereto but may be performed by the encoding unit 110. Each of the index setting unit 108 and the encoding unit 110 may be referred to as a deriving unit.

FIGS. 13A and 13B are diagrams illustrating examples of the WP parameter information that is input to the index setting unit 108 according to the first embodiment. An example of the WP parameter information at the time of P-slice is as illustrated in FIG. 13A, and an example of the WP parameter information at the time of B-slice is as illustrated in FIGS. 13A and 13B. A list number is an identifier representing a prediction direction. The list number has a value of "0" in the case of a single-directional prediction. On the other hand, in the case of a bi-directional prediction, two types of prediction can be used, and accordingly, the list number has two values of "0" and "1". A reference number is a value corresponding to any one of 1 to N represented in the frame memory 206. Since the WP parameter information is maintained for each reference list and reference image, in a case where there are N reference images, 2N pieces of information are necessary at the time of B-slice.

Figure 14:
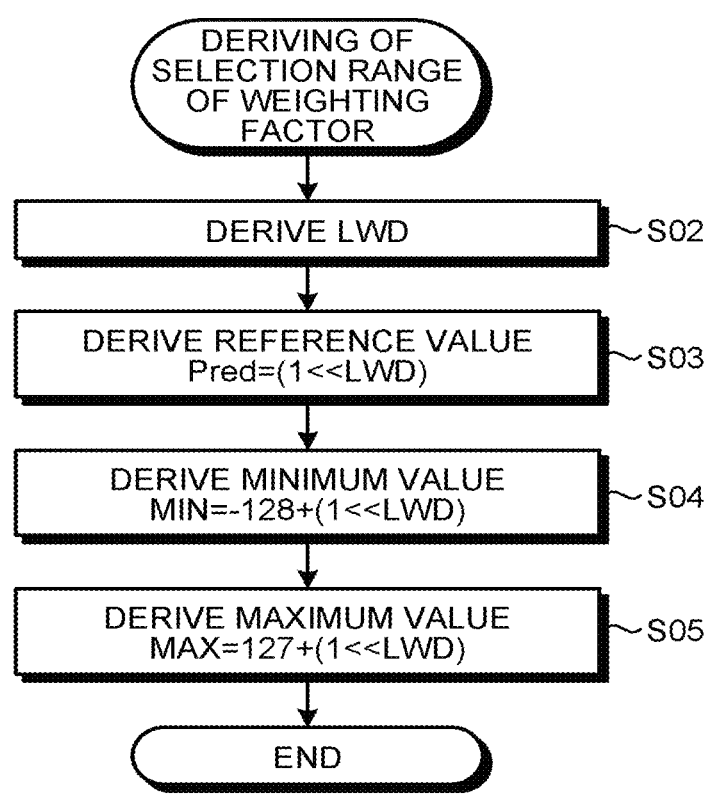
FIG. 14 is a flowchart that illustrates an example of the process of deriving the selection range of the weighting factor according to the first embodiment.

FIG. 14 is a flowchart that illustrates an example of the process of deriving the selection range of the weighting factor according to the first embodiment. Here, while a case is assumed for description in which the index setting unit 108 performs the process of deriving the selection range of the weighting factor, as described above, the process may be performed by the encoding unit 110.

First, the index setting unit 108 derives fixed point precision LWD of the weighting factor (Step S02). Here, the index setting unit 108 may derive the fixed point precision LWD of the weighting factor from the WP parameter information or from the index information.

Subsequently, the index setting unit 108 derives a reference value (1<<LWD) of the weighting factor by using the derived fixed point precision LWD (Step S03).

Subsequently, the index setting unit 108 derives a minimum value of the selection range of the weighting factor by subtracting 128 from the derived reference value (1<<LWD) of the weighting factor (Step S04).

Subsequently, the index setting unit 108 adds 127 to the derived reference value (1<<LWD) of the weighting factor, thereby deriving a maximum value of the selection range of the weighting factor (Step S05).

Then, the index setting unit 108 checks that the weighting factor is included within the derived selection range of the weighting factor.

Referring back to FIG. 1, the encoding unit 110 performs an encoding process of various encoding parameters such as the quantization transformation coefficient input from the quantization unit 103, the motion information input from the motion evaluating unit 109, the index information and the selection range of the weighting factor input from the index setting unit 108, and the quantization information designated by the encoding control unit 111, thereby generating encoded data. As the encoding process, for example, there is a Huffman encoding or arithmetic coding.

Here, the encoding parameters are parameters such as prediction information representing a prediction method or the like, information relating to the quantization transformation coefficient, and information relating to quantization that are necessary for a decoding process. For example, it may be configured such that an internal memory not illustrated in the figure is included in the encoding control unit 111, the encoding parameters are maintained in the internal memory, and the encoding parameters of an adjacent pixel block, which has been completed to be encoded, is used when a pixel block is encoded. For example, in an intra-prediction of H.264, prediction information of a pixel block may be derived from the prediction information of an adjacent block that has been completed to be encoded.

The encoding unit 110 outputs the generated encoded data at appropriate output timing managed by the encoding control unit 111. Various kinds of information, which is output encoded data, for example, is multiplexed by a multiplexing unit not illustrated in the figure or the like, is temporarily stored in an output buffer not illustrated in the figure or the like, and, then, for example, is output to a storage system (storage medium) or a transmission system (communication line).

The encoding unit 110 includes an entropy encoding unit 110A and an index reconfiguring unit 110B.

The entropy encoding unit 110A performs an encoding process such as variable-length coding or arithmetic coding process for information that has been input. For example, in H.264, a context based adaptive variable length coding (CAVLC), context based adaptive binary arithmetic coding (CABAC), or the like is used.

In order to reduce the code length of a syntax element of the index information input from the index setting unit 108, the index reconfiguring unit 110B performs a prediction process based on the characteristics of the parameters of the syntax element, calculates a difference value between the value (direct value) of the syntax element and a predicted value, and outputs the difference to the entropy encoding unit 110A. A specific example of the prediction process will be described later. In addition, in a case where the selection range of the weighting factor is derived by the encoding unit 110, the prediction process is performed by the index reconfiguring unit 110B.

Figure 15:
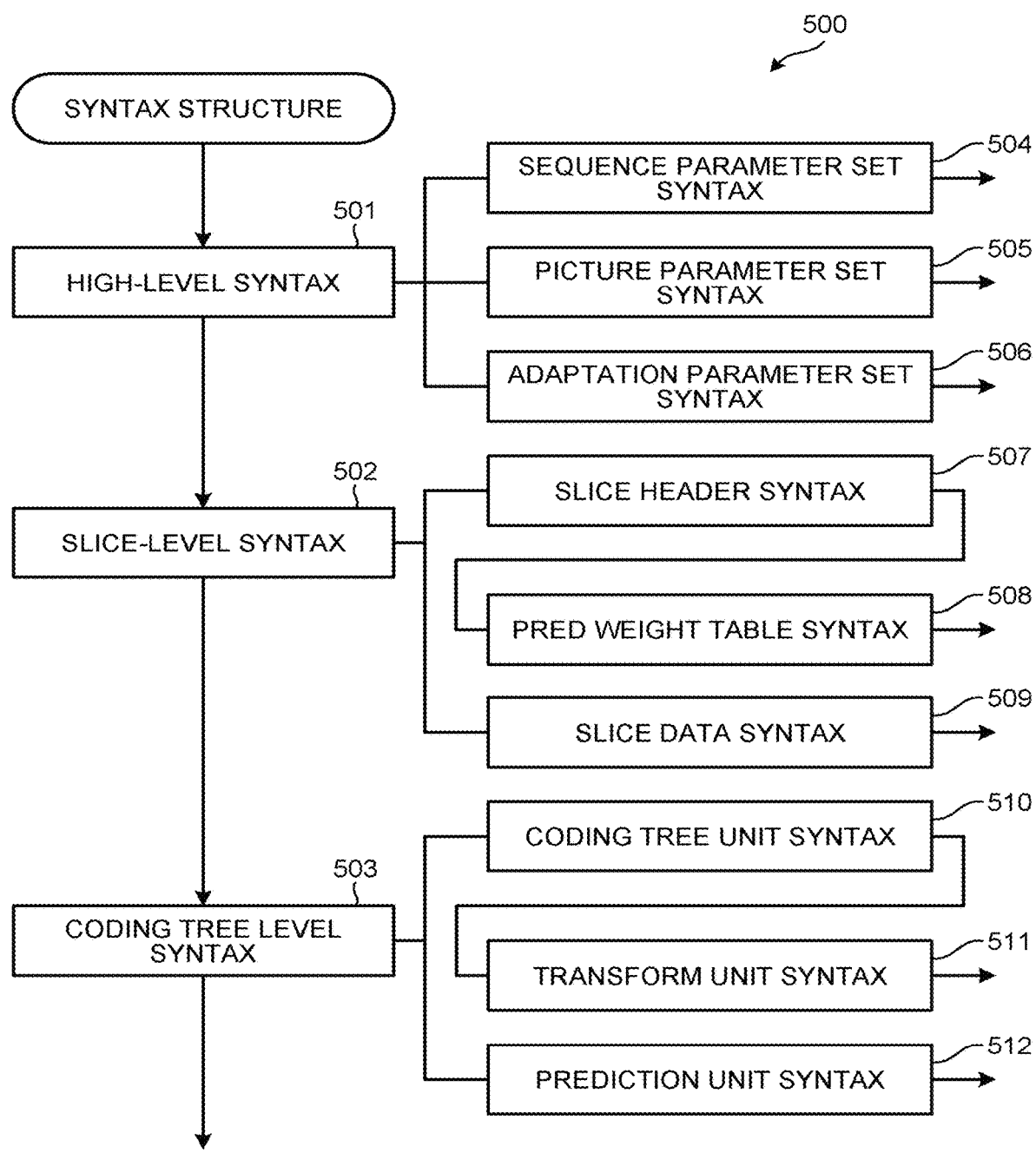
FIG. 15 is a diagram that illustrates an example of syntax according to the first embodiment.

FIG. 15 is a diagram that illustrates an example of syntax 500 used by the encoding device 100 according to the first embodiment. The syntax 500 illustrates the structure of encoded data generated by encoding an input image (moving image data) using the encoding device 100. When the encoded data is decoded, a decoding device to be described later performs a syntax analysis of moving image data by referring to a syntax structure that is the same as that of the syntax 500.

The syntax 500 includes three parts including a high-level syntax 501, a slice-level syntax 502, and a coding tree level syntax 503. The high-level syntax 501 includes syntax information of an upper layer that has a level higher than the slice. The syntax information, for example, includes information of tile shaped divisions described in the example illustrated in FIG. 2B. Here, the slice represents a rectangular area or a continuous area included in a frame or a field. The slice-level syntax 502 includes information that is necessary for decoding each slice. The coding tree level syntax 503 includes information that is necessary for decoding each coding tree (in other words, each coding tree block). Each of these parts includes more detailed syntax.

The high-level syntax 501 includes syntax of a sequence and a picture level such as a sequence parameter set syntax 504, a picture parameter set syntax 505, and an adaptation parameter set syntax 506.

The slice-level syntax 502 includes a slice header syntax 507, a pred weight table syntax 508, a slice data syntax 509, and the like. The pred weight table syntax 508 is called from the slice header syntax 507.

The coding tree level syntax 503 includes a coding tree unit syntax 510, a transform unit syntax 511, a prediction unit syntax 512, and the like. The coding tree unit syntax 510 may have a quadtree structure. More specifically, the coding tree unit syntax 510 may be recursively further called as a syntax element of the coding tree unit syntax 510. In other words, one coding tree block may be subdivided into quadtrees. In addition, the transform unit syntax 511 is included in the coding tree unit syntax 510. The transform unit syntax 511 is called from each coding tree unit syntax 510 located at a tail end of the quadtree. In the transform unit syntax 511, information relating to inverse orthogonal transformation, quantization, and the like is described. In the syntax, information relating to the weighted motion compensation prediction may be described.

FIG. 16 is a diagram that illustrates an example of the picture parameter set syntax 505 according to the first embodiment. Here, weighted_pred_flag, for example, is a syntax element representing the validness or invalidness of a weighted compensation prediction according to the first embodiment for a P-slice. In a case where the weighted_pred_flag is "0", the weighted motion compensation prediction according to the first embodiment within the P-slice is invalid. Accordingly, the WP application flag included in the WP parameter information is constantly set to "0", and the output ends of the WP selectors 304 and 305 are connected to the default motion compensation unit 301. On the other hand, in a case where the weighted_pred_flag is "1", the weighted motion compensation prediction according to the first embodiment within the P-slice is valid.

As another example, in a case where the weighted_pred_flag is "1", the validness or invalidness of the weighted motion compensation prediction according to the first embodiment may be defined for each local area within the slice in the syntax of a lower layer (the slice header, the coding tree block, the transform unit, the prediction unit, and the like).

In addition, weighted_bipred_idc, for example, is a syntax element representing the validness or invalidness of a weighted compensation prediction according to the first embodiment for a B-slice. In a case where the weighted_bipred_idc is "0", the weighted motion compensation prediction according to the first embodiment within the B-slice is invalid. Accordingly, the WP application flag included in the WP parameter information is constantly set to "0", and the output ends of the WP selectors 304 and 305 are connected to the default motion compensation unit 301. On the other hand, in a case where the weighted_bipred_idc is "1", the weighted motion compensation prediction according to the first embodiment within the B-slice is valid.

As another example, in a case where the weighted_bipred_idc is "1", the validness or invalidness of the weighted motion compensation prediction according to the first embodiment may be defined for each local area within the slice in the syntax of a lower layer (the slice header, the coding tree block, the transform unit, the prediction unit, and the like).

FIG. 17 is a diagram that illustrates an example of the slice header syntax 507 according to the first embodiment. Here, slice-type represents the type (an I-slice, a P-slice, a B-slice, or the like) of slice. In addition, pic_parameter_set_id is an identifier representing a picture parameter set syntax to be referred to 505. num_ref_idx_active_override_flag is a flag representing whether to update the number of valid reference images, and, in a case where this flag is "1", num_ref_idx_l0_active_minus1 and num_ref_idx_l1_active_minus1 that define the numbers of reference images of the reference list may be used. In addition, pred_weight_table( ) is a function representing the pred weight table syntax used for a weighted motion compensation prediction, and this function is called in a case where the weighted_pred_flag is "1" in the case of a P-slice and a case where weighted_bipred_idc is "1" in the case of a B-slice.

FIG. 18 is a diagram that illustrates an example of the pred weight table syntax 508 according to the first embodiment. Here, luma_log 2_weight_denom represents the fixed point precision (LWD) of the weighting factor of the luminance signal in a slice and is a value corresponding to LWD represented in Numerical Expression (7) or (9). In addition, delta_chroma_log 2_weight_denom represents the fixed point precision of a color difference signal in a slice and a deriving method thereof will be described later. chroma_format_idc is an identifier representing a color space, and MONO_IDX is a value representing a monochrome video. In addition, num_ref_common_active_minus1 represents a value that is acquired by subtracting one from the number of reference images included in a common list in a slice.

luma_weight_l0_flag and luma_weight_l1_flag represent WP application flags of luminance signals corresponding to Lists 0 and 1. In a case where this flag is "1", a weighted motion compensation prediction of the luminance signal according to the first embodiment is valid for all the areas within the slice. In addition, chroma_weight_l0_flag and chroma_weight_l1_flag represent WP application flags of color difference signals corresponding to Lists 0 and 1. In a case where this flag is "1", a weighted motion compensation prediction of a color difference signal according to the first embodiment is valid for all the area within the slice. luma_weight_l0[i] and luma_weight_l1[i] are weighting factors of the luminance signals, which correspond to the i-th reference number, managed by Lists 0 and 1. In addition, luma_offset_l0[i] and luma_offset_l1[i] are offsets of the luminance signals, which correspond to the i-th reference number, managed by Lists 0 and 1. These are values corresponding to $w_{0C}, w_{1C}, o_{0C}, o_{1C}$ represented in Numerical Expression (7) or (9). Here, C=Y.

chroma_weight_l0[i][j] and chroma_weight_l1[i][j] are weighting factors of the color difference signals, which correspond to the i-th reference number, managed by Lists 0 and 1. In addition, chroma_offset_l0[i][j] and chroma_offset_l1[i][j] are offsets of the color difference signals, which correspond to the i-th reference signal, managed by Lists 0 and 1. These are values corresponding to $w_{0C}, w_{1C}, o_{0C}, o_{1C}$ represented in Numerical Expression (7) or (9). Here, C=Cr or Cb. In addition, j represents a component of the color difference, and, for example, in the case of a signal of YUV 4:2:0, j=0 represents a Cr component, and j=1 represents a Cb component. Furthermore, this representation may be used such that j=0 is the Cb component, and j=1 represents the Cr component.

Here, a method of predicting each syntax element relating to the weighted prediction in the syntax configuration will be described in detail. The prediction of the syntax element is performed by the index reconfiguring unit 110B. In the example illustrated in FIG. 18, each syntax element of which the prediction has been introduced is denoted by attaching a prefix "delta".

First, an inter-signal prediction method of luma_log 2_weight_denom and chroma_log 2_weight_denom representing the fixed point precision of the weighting factor will be described. The index reconfiguring unit 110B performs the inter-signal prediction method of luma_log 2_weight_denom and chroma_log 2_weight_denom using Numerical Expression (12) and performs a restoration process using Numerical Expression (13). Here, as illustrated in FIG. 18, since luma_log 2_weight_denom is defined first, chroma_log 2_weight_denom is predicted based on the value of luma_log 2_weight_denom.

$$\text{delta\_chroma\_log 2\_weight\_denom} = (\text{chroma\_log 2\_weight\_denom} - \text{luma\_log 2\_weight\_denom}) \quad (12)$$

$$\text{chroma\_log 2\_weight\_denom} = (\text{luma\_log 2\_weight\_denom} + \text{delta\_chroma\_log 2\_weight\_denom}) \quad (13)$$

In a fading effect, generally, since there are a small number of cases in which changes in time are made differently for each color space, the fixed point precision for each signal component has strong correlation with a luminance component and a color difference component. Accordingly, by making a prediction inside the color space as described above, the amount of information representing the fixed point precision can be reduced.

In Numerical Expression (12), although the luminance component is subtracted from the color difference component, the color difference component may be subtracted from the luminance component. In such a case, Numerical Expression (13) may be changed in accordance with Numerical Expression (12).

Next, a method of predicting luma_weight_lx[i] and chroma_weight_lx[i][j] representing weighting factors of the luminance and the color difference signal will be described. Here, x is an identifier representing "0" or "1". The values of luma_weight_lx[i] and chroma_weight_lx[i][j] change in accordance with the values of luma_log 2_weight_denom and chroma_log 2_weight_denom. For example, in a case where the value of luma_log 2_weight_denom is "3", luma_weight_lx[i] is (1<<3) in a case where no change in the pixel value is assumed. On the other hand, in a case where the value of luma_log 2_weight_denom is "5", luma_weight_lx[i] is (1<<5) in a case where no change in brightness is assumed.

Accordingly, the index reconfiguring unit 110B performs a prediction process with a weighting factor of a case where there is no change in the pixel value being used as a reference coefficient (default value). More specifically, the index reconfiguring unit 110B performs a prediction process of luma_weight_lx[i] using Numerical Expressions (14) and (15) and performs a restoration process using Numerical Expression (16). Similarly, the index reconfiguring unit 110B performs a prediction process of chroma_weight_lx[i] using Numerical Expressions (17) and (18) and performs a restoration process using Numerical Expression (19).

$$\text{delta\_luma\_weight\_}lx[i] = (\text{luma\_weight\_}lx[i] - \text{default\_luma\_weight\_}lx) \quad (14)$$

$$\text{default\_luma\_weight\_}lx = (1 << \text{luma\_log 2\_weight\_denom}) \quad (15)$$

$$\text{luma\_weight\_}lx[i] = (\text{default\_luma\_weight\_}lx + \text{delta\_luma\_weight\_}lx[i]) \quad (16)$$

$$\text{delta\_chroma\_weight\_}lx[i][j] = (\text{chroma\_weight\_}lx[i][j] - \text{default\_chroma\_weight\_}lx) \quad (17)$$

$$\text{default\_chroma\_weight\_}lx = (1 << \text{chroma\_log 2\_weight\_denom}) \quad (18)$$

$$\text{chroma\_weight\_}lx[i][j] = (\text{default\_chroma\_weight\_}lx + \text{delta\_chroma\_weight\_}lx[i][j]) \quad (19)$$

Here, default_luma_weight_lx, default_chroma_weight_lx are reference values (default values) of a case where there is no pixel value change in the luminance component and the color difference component.

An image including a fading effect fades at a specific fading change point, and there are many cases where the other images are ordinary natural images or images having no fading effect. In such a case, there are many cases where the weighting factor takes a case where there is no change in the pixel value. Accordingly, an initial value of a case where there is no change in the pixel value is derived based on the fixed point precision and is used as a predicted value, whereby the code amount of the weighting factor can be reduced.

Next, a prediction method of chroma_offset_lx[i][j] representing an offset of the color difference signal will be described. In the color space of YUV, a color difference component represents a color using the amount of a deviation from a median value. Accordingly, the amount of change based on a change in the pixel value with the median value considered can be set as a predicted value using a weighting factor. More specifically, the index reconfiguring unit 110B performs a prediction process of chroma_offset_lx[i][j] using Numerical Expressions (20) and (21) and performs a restoration process using Numerical Expression (22).

$$\text{delta\_chroma\_offset\_}lx[i][j] = (\text{chroma\_offset\_}lx[i][j] + ((MED * \text{chroma\_weight}lx[i][j]) >> \text{chroma\_log 2\_weight\_denom}) - MED) \quad (20)$$

$$MED = (\text{MaxChromaValue} >> 1) \quad (21)$$

Here, MaxChromaValue represents maximal pixel value at which a color different signal is obtained. For example, in the case of an 8-bit signal, MaxChromaValue is 255, and MED is 128.

$$\text{chroma\_offset\_}lx[i][j] = (\text{delta\_chroma\_offset\_}lx[i][j] - (MED * \text{chroma\_weight\_}lx[i][j]) >> \text{chroma\_log 2\_weight\_denom}) + MED) \quad (22)$$

By introducing a predicted value acquired by considering the amount of a deviation from the median value using the characteristics of the color difference signal, the code amount of the offset value of the color difference signal is smaller than that of a case where the offset value is directly encoded.

FIG. 19 is an explanatory diagram that illustrates an example of the relation of values of syntax elements according to the first embodiment and illustrates the relation of values of luma_log 2_weight_denom, default_luma_weight_lx, luma_weight_lx[i], and delta_luma_weight_lx[i]. As illustrated in FIG. 19, the range of delta_luma_weight_lx[i], which is a syntax element to be encoded by the entropy encoding unit 110A, in other words, the difference value between the weighting factors is fixed to a range of −128 to 127 and has signed 8-bit precision.

As above, in the first embodiment, the selection range of the weighting factor is derived by assigning values in the negative and positive direction with the reference point of the weighting factor at which a change in the pixel value is zero being set as the approximate center, and it is checked that the weighting factor is included in the derived selection range of the weighting factor. Therefore, according to the first embodiment, the selection range of the weighting factor expands, and a positive-side value having a high selection frequency can be easily taken, compared to the case of H.264 or the like. In addition, according to the first embodiment, since the difference value between the weighting factors of the encoding target takes a signed 8-bit value of −128 to 127 as a fixed value, the selection range of the signed 8-bit precision can be defined while the selection range of the weighting factor is expanded.

As above, in the first embodiment, since the range of the syntax (the difference value between the weighting factors) to be encoded can have a fixed value, the specifications can be simplified compared to a configuration in which an encoder dynamically changes such a range. For example, in a case where the syntax to be encoded is set as a weighting factor, and the selection range of the weighting factor changes in accordance with the reference value of the weighting factor, a configuration, in which a table associating the reference value of the weighting factor and a minimum value and a maximum value of the selection range of the weighting factor is prepared, and the table is referred to every time when the selection range of the weighting factor is derived, or a configuration, in which the selection range of the weighting factor is calculated to be derived each time, is necessary. In such a case, a configuration for referring to the table each time the table is loaded into a memory or a calculation circuit used for calculating the selection range of the weighting factor each time is necessary, whereby the hardware scale increases. In contrast to this, according to the first embodiment, since the range of the syntax (a difference value between the weighting factors) to be encoded can be configured as a fixed value, the hardware scale can be reduced without having restrictions of the hardware configuration described above or the like.

In addition, in the first embodiment, while a difference value between the weighting factors of which the range is fixed to the signed 8-bit precision is encoded, the difference value between the weighting factors takes a value near the center of the range (near zero), and accordingly, the code length at the time of encoding can be shortened, whereby the coding efficiency can be improved. In H.264 or the like, while the weighting factor is encoded by signed exponential Golomb coding (se(v)), this coding is effective for a symbol of which the value to be encoded exponentially increases with zero used as a reference, and accordingly, generally, a reference value having the highest use frequency is set at the center of the range. In the first embodiment, a case where a pixel value change between pictures of a general moving image is zero is used as a reference value of the weighting factor, and, also in a prediction for the selection range of the weighting factor, a prediction from the reference value is introduced. From this, the selection ranges of an exponential Golomb coding prediction and the weighting factor match each other, and the effect of reducing the code amount is high. In addition, since the coefficient range is determined with the reference value set as the center, even in a case where a large value is taken, the degrees of distances of the positive value and the negative value from the reference value are the same, whereby there is an advantage of capable of encoding data using a code length shorter than that of a conventional technique.

In addition, between rows of the syntax table illustrated in FIGS. 16 to 18 according to the first embodiment as examples, a syntax element not defined in this embodiment may be inserted, or a description relating to the other conditional branch may be included. Furthermore, the syntax table may be divided into a plurality of tables, or a plurality of the syntax tables may be integrated. In addition, the term of each syntax element represented as an example may be arbitrarily changed.

Second Embodiment

In a second embodiment, a decoding device decoding encoded data encoded by the encoding device according to the first embodiment will be described. Also in the second embodiment, similarly to the first embodiment, the description will be presented with assuming a case where there is no change in the pixel value, in other words, a case where the value of the weighting factor is 1.0 when represented as a real value.

Figure 20:
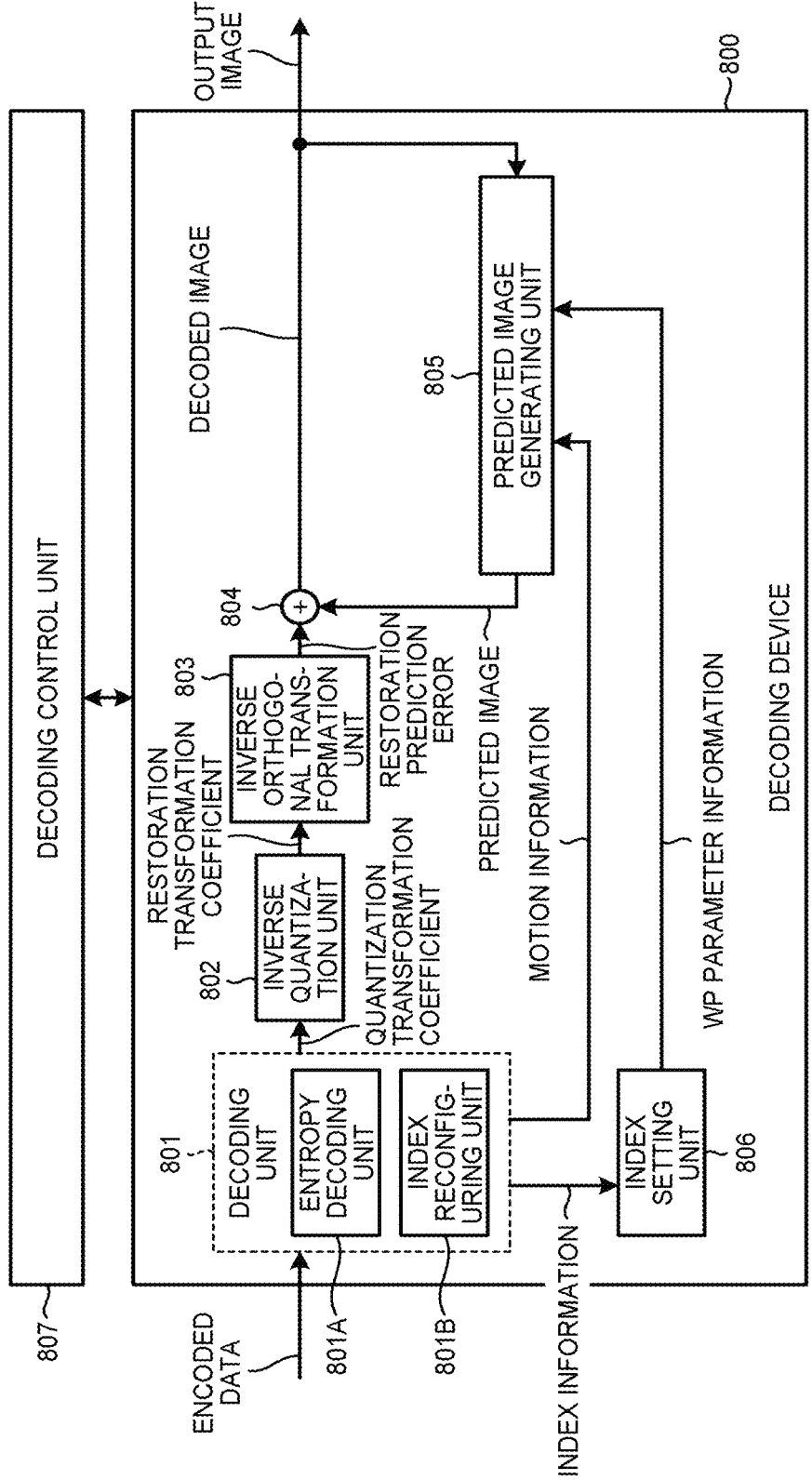
FIG. 20 is a block diagram that illustrates an example of the configuration of a decoding device according to a second embodiment.

FIG. 20 is a block diagram that illustrates an example of the configuration of a decoding device 800 according to the second embodiment.

The decoding device 800 decodes encoded data stored in an input buffer not illustrated in the figure or the like into a decoded image and outputs the decoded image to an output buffer not illustrated in the figure as an output image. The encoded data, for example, is output from the encoding device 100 illustrated in FIG. 1 or the like and is input to the decoding device 800 through a storage system, a transmission system, a buffer, or the like not illustrated in the figure.

The decoding device 800, as illustrated in FIG. 20, includes: a decoding unit 801, an inverse quantization unit 802; an inverse orthogonal transformation unit 803; an addition unit 804; a predicted image generating unit 805; and an index setting unit 806. The inverse quantization unit 802, the inverse orthogonal transformation unit 803, the addition unit 804, and the predicted image generating unit 805 are elements that are substantially the same as or similar to the inverse quantization unit 104, the inverse orthogonal transformation unit 105, the addition unit 106, and the predicted image generating unit 107 illustrated FIG. 1. In addition, a decoding control unit 807 illustrated in FIG. 20 controls the decoding device 800 and, for example, is realized by a CPU or the like.

In order to decode encoded data, the decoding unit 801 performs decoding based on the syntax for each frame or each field. The decoding unit 801 includes an entropy decoding unit 801A and an index reconfiguring unit 801B.

The entropy decoding unit 801A sequentially performs entropy decoding of a code string of each syntax and regenerates motion information including a prediction mode, a motion vector, and a reference number, index information used for predicting a weighted motion-compensated prediction, and encoding parameters of an encoding target block such as a quantization transformation coefficient and the like. In addition, the entropy decoding is also called parsing processing or the like. Here, the encoding parameters are all the parameters that are necessary for decoding information relating to a transformation coefficient, information relating to quantization, and the like in addition to those described above.

More specifically, the entropy decoding unit 801A has a function for performing a decoding process such as a variable-length decoding process or an arithmetic decoding process for input encoded data. For example, in H.264, context based adaptive variable length coding (CAVLC), context based adaptive binary arithmetic coding (CABAC), or the like is used, and input encoded data is decoded into a syntax element having a meaning. Such a process is also called a decoding process.

The index reconfiguring unit 801B reconfigures index information by restoring the decoded index information. More specifically, in order to reduce the code length of the syntax elements of the decoded index information, the index reconfiguring unit 801B performs a prediction process in accordance with the characteristics of parameters of the syntax elements, restores the syntax elements, and reconfigures the index information. A specific example of the prediction process will be described later.

The decoding unit 801 outputs the motion information, the index information, and the quantization transformation coefficient, so as to input the quantization transformation coefficient to the inverse quantization unit 802, input the index information to the index setting unit 806, and input the motion information to the predicted image generating unit 805.

The inverse quantization unit 802 performs an inverse quantization process for the quantization transformation coefficient input from the decoding unit 801 and acquires a restoration transformation coefficient. More specifically, the inverse quantization unit 802 performs inverse quantization based on the quantization information used by the decoding unit 801. Described in more detail, the inverse quantization unit 802 multiplies the quantization transformation coefficient by a quantization step size derived based on the quantization information, thereby acquiring a restored transformation coefficient. The inverse quantization unit 802 outputs the restored transformation coefficient so as to be input to the inverse orthogonal transformation unit 803.

The inverse orthogonal transformation unit 803 performs an inverse orthogonal transformation corresponding to the orthogonal transformation performed on the encoding side for the restored transformation coefficient input from the inverse quantization unit 802, thereby acquiring a restored prediction error. The inverse orthogonal transformation unit 803 outputs the restored prediction error so as to be input to the addition unit 804.

The addition unit 804 adds the restored prediction error input from the inverse orthogonal transformation unit 803 and a corresponding predicted image, thereby generating a decoded image. The addition unit 804 outputs the decoded image so as to be input to the predicted image generating unit 805. In addition, the addition unit 804 outputs the decoded image to the outside as an output image. Thereafter, the output image is temporarily stored in an external output buffer not illustrated in the figure or the like and is output to a display device system such as a display or a monitor not illustrated in the figure or a video device system, for example, at output timing managed by the decoding control unit 807.

The index setting unit 806 receives the index information input from the decoding unit 801, converts the index information into WP parameter information, and outputs the WP parameter information so as to be input to the predicted image generating unit 805. More specifically, the index setting unit 806 receives the index information that has been processed to be decoded by the entropy decoding unit 801A and is reconfigured by the index reconfiguring unit 801B. Then, the index setting unit 806 checks a list of reference images and a reference number, converts the index information into WP parameter information, and outputs the converted WP parameter information to the predicted image generating unit 805. When the index information is converted into WP parameter information, the index setting unit 806 derives the selection range of the weighting factor and checks that the weighting factor is included in the selection range. Here, the driving of the selection range of the weighting factor is the same as that of the first embodiment, and thus, detailed description thereof will not be presented. In addition, the driving of the selection range may be performed not by the index setting unit 806 but by the index reconfiguring unit 801B. Each of the index setting unit 806 and the index reconfiguring unit 801B (the decoding unit 801) may be referred to as a deriving unit.

In addition, similarly to the first embodiment, the WP parameter information includes information of a first WP application flag, a second WP application flag, and weighting information. Furthermore, similarly to the first embodiment, the weighting information includes information of a value $w_{0C}$ of the first weighting factor, a value $w_{1C}$ of the second weighting factor, fixed point precision LWD of the first and second weighting factors, a first offset $o_{0C}$, and a second offset $o_{1C}$.

The predicted image generating unit 805 generates a predicted image by using the motion information input from the decoding unit 801, the WP parameter information input from the index setting unit 806, and the decoded image input from the addition unit 804.

Here, the predicted image generating unit 805 will be described in detail with reference to FIG. 4. The predicted image generating unit 805, similarly to the predicted image generating unit 107, includes: a multi-frame motion compensation unit 201; a memory 202; a single-directional motion compensation unit 203; a prediction parameter control unit 204; a reference image selector 205; a frame memory 206; and a reference image control unit 207.

The frame memory 206 stores the decoded image input from the addition unit 106 as a reference image under the control of the reference image control unit 207. The frame memory 206 includes a plurality of memory sets FM1 to FMN (here, N≥1) used for temporarily storing the reference image.

The prediction parameter control unit 204 prepares a plurality of combinations each of a reference image number and a prediction parameter as a table based on the motion information input from the decoding unit 801. Here, the motion information represents information of a motion vector representing the deviation of a motion that is used for the motion-compensated prediction, the reference image number, and a prediction mode such as a single-directional/bidirectional prediction. The prediction parameter represents information relating to the motion vector and the prediction mode. Then, the prediction parameter control unit 204 selects a combination of a reference number and a prediction parameter used for generating a predicted image based on the motion information and outputs the selected combination so as to allow the reference image number to be input to the reference image selector 205 and allow the prediction parameter to be input to the single-directional motion compensation unit 203.

The reference image selector 205 is a switch that changes one of output terminals of the frame memories FM1 to FMN, which are included in the frame memory 206, to be switched to based on a reference image number input from the prediction parameter control unit 204. For example, when the reference image number is "0", the reference image selector 205 connects the output terminal of the frame memory FM1 to the output terminal of the reference image selector 205, and, when the reference image number is N−1, the reference image selector 205 connects the output terminal of the frame memory FMN to the output terminal of the reference image selector 205. The reference image selector 205 outputs a reference image stored in the frame memory of which the output terminal is connected thereto from among the frame memories FM1 to FMN included in the frame memory 206 so as to be input to the single-directional motion compensation unit 203. In the decoding device 800, the reference image is not used by any unit other than the predicted image generating unit 805, and accordingly, the reference image need not be output to the outside of the predicted image generating unit 805.

The single-directional motion compensation unit 203 performs a motion-compensated prediction process based on the prediction parameter input from the prediction parameter control unit 204 and the reference image input from the reference image selector 205, thereby generating a single-directional predicted image. The motion-compensated prediction has already been described with reference to FIG. 5, and thus, description thereof will not be presented.

The single-directional motion compensation unit 203 outputs a single-directional predicted image and temporarily stores the single-directional predicted image in the memory 202. Here, in a case where the motion information (prediction parameter) represents a bi-directional prediction, the multi-frame motion compensation unit 201 makes a weighted prediction using two types of single-directional predicted images. Accordingly, the single-directional motion compensation unit 203 stores a single-directional predicted image corresponding to the first type in the single-directional predicted image in the memory 202 and directly outputs a single-directional predicted image corresponding to the second type to the multi-frame motion compensation unit 201. Here, the single-directional predicted image corresponding to the first type will be referred to as a first predicted image, and the single-directional predicted image corresponding to the second type will be referred to as a second predicted image.

In addition, two single-directional motion compensation units 203 may be prepared and generate two single-directional predicted images. In such a case, when the motion information (prediction parameter) represents a single-directional prediction, the single-directional motion compensation unit 203 may directly output the first single-directional predicted image to the multi-frame motion compensation unit 201 as a first predicted image.

The multi-frame motion compensation unit 201 makes a weighted prediction by using the first predicted image input from the memory 202, the second predicted image input from the single-directional motion compensation unit 203, and the WP parameter information input from the motion evaluating unit 109, thereby generating a predicted image. The multi-frame motion compensation unit 201 outputs the predicted image so as to be input to the addition unit 804.

Here, the multi-frame motion compensation unit 201 will be described in detail with reference to FIG. 6. Similarly to the predicted image generating unit 107, the multi-frame motion compensation unit 201 includes: a default motion compensation unit 301; a weighted motion compensation unit 302; a WP parameter control unit 303; and WP selectors 304 and 305.

The WP parameter control unit 303 outputs a WP application flag and weighting information based on the WP parameter information input from the index setting unit 806 so as to input the WP application flag to the WP selectors 304 and 305 and input the weighting information to the weighted motion compensation unit 302.

Described in detail, when the WP parameter information is input from the index setting unit 806, the WP parameter control unit 303 outputs the WP parameter information with being divided into the first WP application flag, the second WP application flag, and the weighting information, thereby inputting the first WP application flag to the WP selector 304, inputting the second WP application flag to the WP selector 305, and inputting the weighting information to the weighted motion compensation unit 302.

In addition, when WP parameter information is input, the WP parameter control unit 303 checks whether a value of the weighting information is within a prescribed range. For example, in a case where $w_{0C}$ is 3.0, when represented as a real value, and LWD is 7, the first weighting factor is 384. Here, it is assumed that 384 is out of the range of the first weighting factor and cannot be used. In such a case, the data violates the specification, and accordingly, the WP parameter control unit 303 may notify the decoding control unit 807 of information representing the violation of the specification and stop the decoding process. In addition, the WP parameter control unit 303 may perform a clipping process within the range of the first weighting factor and advance the decoding process. Furthermore, the WP parameter control unit 303 may change the value of the first WP application flag from 1 to 0 and performs a default motion-compensated prediction.

The WP selectors 304 and 305 change the connection ends of the predicted images based on the WP application flags input from the WP parameter control unit 303. In a case where the corresponding WP application flag is "0", each one of the WP selectors 304 and 305 connects the output end thereof to the default motion compensation unit 301. Then, the WP selectors 304 and 305 output the first and second predicted images so as to be input to the default motion compensation unit 301. On the other hand, in a case where the corresponding WP application flag is "1", each one of the WP selectors 304 and 305 connects the output end thereof to the weighted motion compensation unit 302. Then, the WP selectors 304 and 305 output the first and second predicted images so as to be input to the weighted motion compensation unit 302.

The default motion compensation unit 301 performs average processing based on the two single-directional predicted images (the first and second predicted images) input from the WP selectors 304 and 305, thereby generating a predicted image. More specifically, in a case where the first and second WP application flags are "0", the default motion compensation unit 301 performs average processing based on Numerical Expression (1).

In addition, in a case where the prediction mode represented by the motion information (prediction parameter) is the single-directional prediction, the default motion compensation unit 301 calculates a final predicted image using only the first predicted image based on Numerical Expression (4).

The weighted motion compensation unit 302 performs weighted motion compensation based on the two single-directional predicted images (the first and second predicted images) input from the WP selectors 304 and 305 and the weighting information input from the WP parameter control unit 303. More specifically, in a case where the first and second WP application flags are "1", the weighted motion compensation unit 302 performs the weighting process based on Numerical Expression (7).

In addition, in a case where the calculation precision of the first and second predicted images and the calculation precision of the predicted image are different from each other, the weighted motion compensation unit 302 realizes a rounding process by controlling LWD, which is fixed point precision, as in Numerical Expression (8).

In addition, in a case where the prediction mode represented by the motion information (prediction parameter) is a single directional prediction, the weighted motion compensation unit 302 calculates a final predicted image using only the first predicted image based on Numerical Expression (9).

In addition, in a case where the calculation precision of the first and second predicted images and the calculation precision of the predicted image are different from each other, the weighted motion compensation unit 302 realizes a rounding process by controlling LWD, which is fixed point precision, as in Numerical Expression (8), similarly to the case of the bi-directional prediction.

The fixed point precision of the weighting factor has already been described with reference to FIG. 7, and thus, description thereof will not be presented. In addition, in the case of a single directional prediction, various parameters (the second WP application flag, the second weighting factor, and the second offset information) corresponding to the second predicted image are not used and may be set to initial values determined in advance.

The decoding unit 801 uses syntax 500 represented in FIG. 15. The syntax 500 represents the structure of encoded data that is a decoding target of the decoding unit 801. The syntax 500 has already been described with reference to FIG. 15, and thus, description thereof will not be presented. In addition, the picture parameter set syntax 505 has been described with reference to FIG. 16 except that decoding is used instead of encoding, and thus, description thereof will not be presented. Furthermore, the slice header syntax 507 has already been described with reference to FIG. 17 except that decoding is used instead of encoding, and thus, description thereof will not be presented. In addition, the pred weight table syntax 508 has already been described with reference to FIG. 18 except that decoding is used instead of encoding, and thus, description thereof will not be presented.

Here, a method of predicting each syntax element relating to the weighted prediction in the syntax configuration will be described in detail. The prediction of the syntax element is performed by the index reconfiguring unit 801B. The syntax configuration explicitly representing the prediction method according to the second embodiment is the same as that of the first second embodiment.

In the inter-signal prediction method of luma_log 2_weight_denom and chroma_log 2_weight_denom representing the fixed point precision of the weighting factor, a restoration process is performed using Numerical Expression (13).

In the prediction method of luma_weight_lx[i] and chroma_weight_lx[i][j] representing weighting factors of the luminance and the color difference signal, a restoration process is performed using Numerical Expressions (16) and (19).

A plurality of the prediction methods described above may not only be used independently but also be used in a combined manner. For example, by combining Numerical Expressions (13), (15), and (19), or the like, the code amount of the syntax element of the index information can be efficiently reduced.

As above, in the second embodiment, the selection range of the weighting factor is derived by assigning values in the negative and positive direction with the reference point of the weighting factor at which a change in the pixel value is zero being set as the approximate center, and it is checked that the weighting factor is included in the derived selection range of the weighting factor. Therefore, according to the second embodiment, the selection range of the weighting factor expands, and a positive-side value having a high selection frequency can be easily taken, compared to the case of H.264 or the like. In addition, according to the first embodiment, since the difference value between the weighting factors of the decoding target takes a signed 8-bit value of −128 to 127 as a fixed value, the selection range of the signed 8-bit precision can be defined while the selection range of the weighting factor is expanded.

As above, in the second embodiment, since the range of the syntax (the difference value between the weighting factors) to be decoded can have a fixed value, the decoder can check in a simplified manner whether the encoded data that has been decoded is within the range of the predetermined specifications, and the specifications can be simplified. For example, in a case where the syntax to be decoded is set as a weighting factor, and the selection range of the weighting factor changes in accordance with the reference value of the weighting factor, a configuration is necessary in which a table associating the reference value of the weighting factor and a minimum value and a maximum value of the selection range of the weighting factor is prepared, and the table is referred to every time when the selection range of the weighting factor is derived. In such a case, a configuration for referring to the table each time the table is loaded into a memory is necessary, whereby the hardware scale increases. In contrast to this, according to the second embodiment, since the range of the syntax (a difference value between the weighting factors) to be decoded can be configured to have a fixed value, the hardware scale can be reduced without having restrictions of the hardware configuration described above or the like.

In addition, in the second embodiment, while a difference value between the weighting factors of which the range is fixed to the signed 8-bit precision is decoded, the difference value between the weighting factors takes a value near the center of the range (near zero), and accordingly, the code length at the time of decoding can be shortened, whereby the coding efficiency can be improved. In H.264 or the like, while the weighting factor is decoded by signed exponential Golomb coding (se(v)), this coding is effective for a symbol of which the value to be decoded exponentially increases with zero used as a reference, and accordingly, generally, a reference value having the highest use frequency is set at the center of the range. In the second embodiment, a case where a pixel value change between pictures of a general moving image is zero is used as a reference value of the weighting factor, and, also in a prediction for the selection range of the weighting factor, a prediction from the reference value is introduced. From this, the selection ranges of an exponential Golomb coding prediction and the weighting factor match each other, and the effect of reducing the code amount is high. In addition, since the coefficient range is determined with the reference value set as the center, even in a case where a large value is taken, the degrees of distances of the positive value and the negative value from the reference value are the same, whereby there is an advantage of capable of decoding data using a code length shorter than that of a conventional technique.

Modification 1 of First Embodiment

In the first embodiment, while the deriving of the selection range of the weighting factor in the encoding device 100 has been described, in Modification 1, the driving of a selection range of the offset in the encoding device 100 will be described.

As described with reference to Numerical Expressions (20) to (22), in the color space of YUV, a color difference component represents a color using the amount of a deviation from a median value. Accordingly, the amount of change from a change in the pixel value with the median value being considered using the weighting factor can be set as a predicted value. This predicted value represents the reference value of the offset in a case where the influence of the weighting factor is excluded. In other words, the index setting unit 108 can derive the selection range of the offset by assigning a range taken by the value with the predicted value (the reference value of the offset) set as the approximate center and can check that the offset is included in the derived selection range of the offset.

For example, in a case where LWD is 2, and the value of the weighting factor is 5, the reference value of the weighting factor is (1<<2), in other words, 4. On the other hand, since the value of the weighting factor is 5, a change in the pixel value occurs. Since the color difference signal represents a color using the amount of a deviation from the median value, the index setting unit 108 acquires the reference value of the offset by excluding the influence of the weighting factor. The reference value of the offset is formulated using Numerical Expression (23).

$$Pred=(MED-((MED*chroma\_weight\_lx[i][j])>> chroma\_log 2\_weight\_denom)) \quad (23)$$

Here, Pred represents the reference value of the offset of the color difference signal, MED represents a median value (128 in the case of 8 bits) of the color difference signal, and the right term represents the amount of a deviation from the median value due to the influence of the weighting factor. In addition, Numerical Expression (23) corresponds to a value acquired by inverting the sign of a right-end term of Numerical Expression (20). As represented in Numerical Expression (23), the reference value of the offset of the color difference signal is determined based on the weighting factor of the color difference signal and the fixed precision.

In addition, Numerical Expression (23) may be transformed as Numerical Expression (24).

$$Pred=((1<<(BitDepth-1))-((chroma\_weight\_lx[i][j])<<(BitDepth-1-chroma\_log 2\_weight\_denom)) \quad (24)$$

Here, BitDepth represents a pixel depth of the color difference signal, and BitDepth is 8 in the case of an 8-bit signal. Since MED represented in Numerical Expression (23) is a value represented as the power of 2, and, by rewriting the inside of the shift on the right side using BitDepth, it can be represented as Numerical Expression (24).

Figure 21:
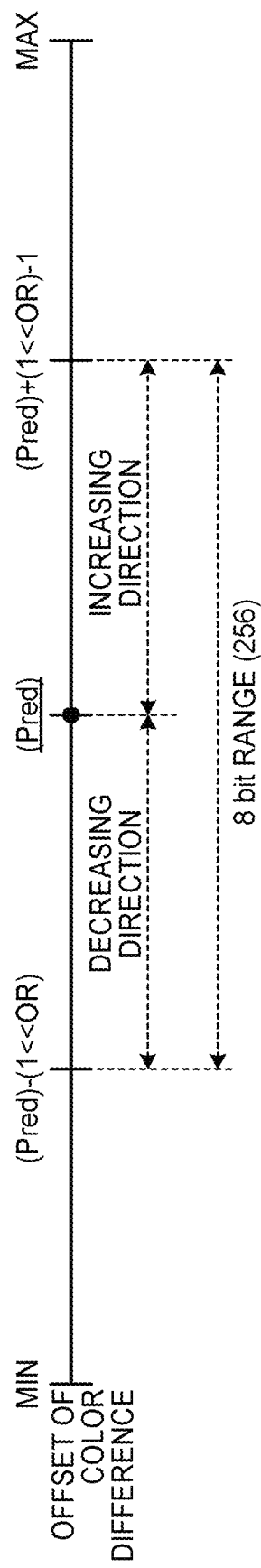
FIG. 21 is an explanatory diagram that illustrates an example of the selection range of an offset according to Modification 1.

FIG. 21 is an explanatory diagram that illustrates an example of the selection range of the offset of the color difference signal according to Modification 1. In the example illustrated in FIG. 21, Pred is arranged so as to be positioned at the approximate center of the selection range, (Pred)−(1<<OR) is a minimum value of the selection range, and (Pred)+(1<<OR)−1 is a maximum value of the selection range. In addition, OR represents the bit precision of the offset and, for example, 8 in H.264 or the like. As illustrated in FIG. 21, the selection range of the offset of the color difference signal is defined within predetermined bit precision with the reference value of the offset of the color difference signal being the approximate center. Although detailed description will not be presented, a difference value (a difference value between the offset of the color difference signal and the reference value of the offset of the color difference signal) between offsets of color difference signals of the encoding target can be defined as a fixed value of the bit precision of the offset. For example, in the case of 8-bit precision, the difference value between the offsets of the color difference signals is an 8-bit fixed value of −128 to 127. In addition, for example, in the case of 9-bit precision, the difference value between the offsets of the color difference signals is a 9-bit fixed value of −256 to 255.

From this, a problem in which the range of a value to be encoded is not determined without restoring the reference value can be solved. In addition, in Modification 1, while an example has been described in which the selection range of the offset of the color difference signal is derived by the index setting unit 108, the deriving of the selection range is not limited thereto but may be performed by the encoding unit 110.

Figure 22:
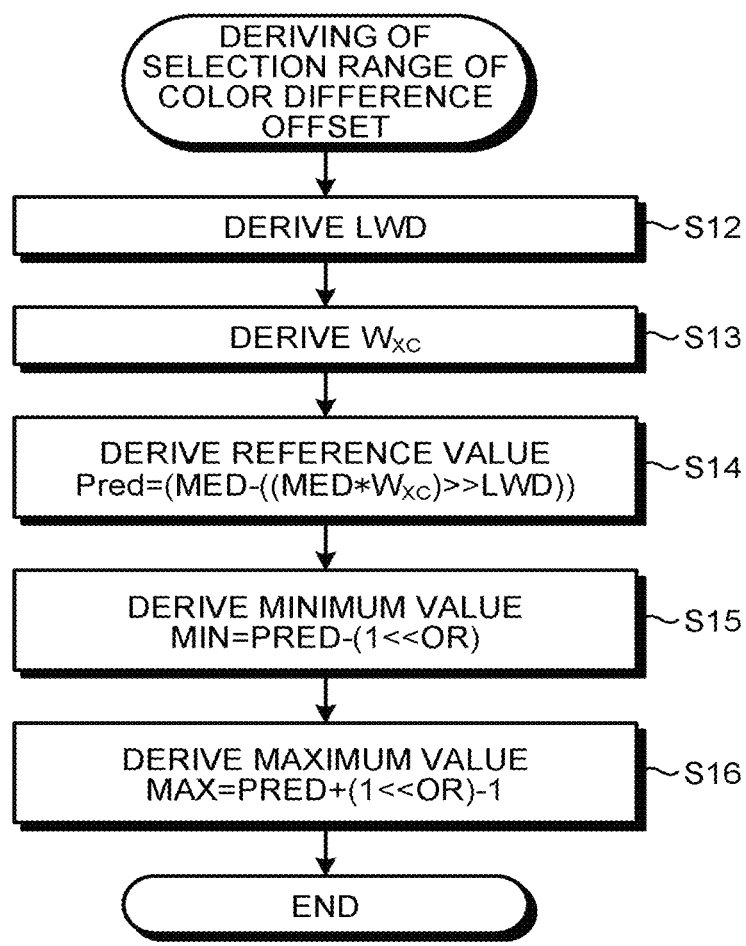
FIG. 22 is a flowchart that illustrates an example of the process of deriving the selection range of the offset according to Modification 1.

FIG. 22 is a flowchart that illustrates an example of the process of deriving the selection range of the offset of the color difference signal according to Modification 1. Here, while a case will be assumed to be described in which the index setting unit 108 performs the process of deriving the selection range of the offset of the color difference signal, as described above, the process may be performed by the encoding unit 110.

First, the index setting unit 108 derives the fixed point precision LWD of the weighting factor (Step S12). Here, the index setting unit 108 may derive the fixed point precision LWD of the weighting factor either from the WP parameter information or from the index information.

Subsequently, the index setting unit 108 derives the weighting factor $W_{xc}$ (S13). Here, the index setting unit 108 may derive the weighting factor $W_{xc}$ either from the WP parameter information or from the index information.

Subsequently, the index setting unit 108 derives the reference value of the offset of the color difference signal using Numerical Expression (23) by using the fixed precision LWD of the weighting factor and the weighting factor $W_{xc}$ that have been derived (Step S14).

Subsequently, the index setting unit 108 derives a minimum value of the selection range of the offset of the color difference signal by subtracting (1<<OR) from the derived reference value of the offset of the color difference signal (Step S15).

Subsequently, the index setting unit 108 adds (1<<OR)−1 to the derived reference value of the offset of the color difference signal, thereby deriving a maximum value of the selection range of the offset of the color difference signal (Step S16).

Then, the index setting unit 108 checks that the offset of the color difference signal is included within the derived selection range of the offset of the color difference signal. In addition, in a case where it is checked that the offset of the color difference signal is not included in the selection range of offset of the color difference signal, the index setting unit 108 may perform a clipping process using a maximum value or a minimum value of the selection range of the offset of the color difference signal. In such a case, the index setting unit 108 may clip the offset of the color difference signal to the minimum value in a case where the offset of the color difference signal is less than the minimum value of the selection range and clip the offset of the color difference signal to the maximum value in a case where the offset of the color difference signal is more than the maximum value of the selection range. By introducing such a clipping process, the value of the encoding target such as the difference value between the offset of the color difference signal takes a value within the predetermined bit precision without arranging a specific range restriction, and accordingly, the configuration of the circuit scale used by the hardware can be clarified.

In addition, as described with reference to FIG. 18, the information of the value of the weighting factor and the fixed point precision is encoded first before the information of the offset, the value of the weighting factor can be derived when the reference value of the offset is derived.

Furthermore, the selection ranges of the first and second offsets for the color difference signal described in Modification 1 may be applied separated from the selection ranges of the first and second weighting factors described in the first embodiment. For example, it may be configured such that the selection ranges of the first and second weighting factor are the same in H.264, and the selection ranges of the first and second offsets are as those of Modification 1.

According to Modification 1, since the range of the syntax (the difference value between the offsets) to be encoded can have a fixed value, the specifications can be simplified compared to a configuration in which an encoder dynamically changes such a range. In addition, in a case where the syntax to be encoded is set as an offset, and the selection range of the offset changes in accordance with the reference value of the offset, a configuration, in which a table associating the reference value of the offset and a minimum value and a maximum value of the selection range of the offset is prepared, and the table is referred to every time when the selection range of the offset is derived, or a configuration, in which the selection range of the offset is calculated to be derived each time, is necessary. In such a case, a configuration for referring to the table each time the table is loaded into a memory or a calculation circuit used for calculating the selection range of the offset each time is necessary, whereby the hardware scale increases. In contrast to this, in a case where the range of the syntax (a difference value between offsets) to be encoded is fixed as in Modification 1, the hardware scale can be reduced without having restrictions of the hardware configuration described above or the like.

Modification 1 of Second Embodiment

In the second embodiment, while the deriving of the selection range of the weighting factor in the decoding device 800 has been described, in Modification 1 of the second embodiment, the driving of a selection range of the offset in the decoding device 800 will be described. In Modification 1 of the second embodiment, the index setting unit 806 can derive the selection range of the offset by assigning a range taken by the value with the predicted value (the reference value of the offset) set as the approximate center and can check that the offset is included in the derived selection range of the offset. The deriving of the selection range of the offset is the same as that of Modification 1 of the first embodiment, and thus, detailed description thereof will not be presented. In addition, the deriving of the selection range of the offset may be performed not by the index setting unit 806 but by the index reconfiguring unit 801B.

According to Modification 1 of the second embodiment, since the range of the syntax (the difference value between the offsets) to be encoded can have a fixed value, the specifications can be simplified compared to a configuration in which an encoder dynamically changes such a range. In addition, in a case where the syntax to be encoded is set as an offset, and the selection range of the offset changes in accordance with the reference value of the offset, a configuration, in which a table associating the reference value of the offset and a minimum value and a maximum value of the selection range of the offset is prepared, and the table is referred to every time when the selection range of the offset is derived, or a configuration, in which the selection range of the offset is calculated to be derived each time, is necessary. In such a case, a configuration for referring to the table each time the table is loaded into a memory or a calculation circuit used for calculating the selection range of the offset each time is necessary, whereby the hardware scale increases. In contrast to this, in a case where the range of the syntax (a difference value between offsets) to be encoded is fixed as in Modification 1, the hardware scale can be reduced without having restrictions of the hardware configuration described above or the like.

Modification 2 of First Embodiment

In the first embodiment, while the deriving of the selection range of the weighting factor in the encoding device 100 has been described, in Modification 2, an example will be described in which the selection range of the weighting factor is shifted when the selection range of the weighting factor is derived in the encoding device 100.

In the first embodiment, as described with reference to FIG. 9, the approximate center of the selection range of the weighting factor is set as the reference value of the weighting factor. In addition, as described with reference to FIG. 7 and the like, in a case where there is no change in the pixel value between images on the average, the value of the weighting factor is 1.0 when represented as a real value, and the range in which the weighting factor is negative is not selected in the single-directional weighted prediction. From this, it is understood that, in the selection range of the weighting factor that is practically operated, the frequency of selection near the reference value is the highest, and a negative range is not used much. Accordingly, in Modification 2, the index setting unit 108 shifts the selection range of the weighting factor to the positive side when the selection range of the weighting factor is derived.

Figure 23:
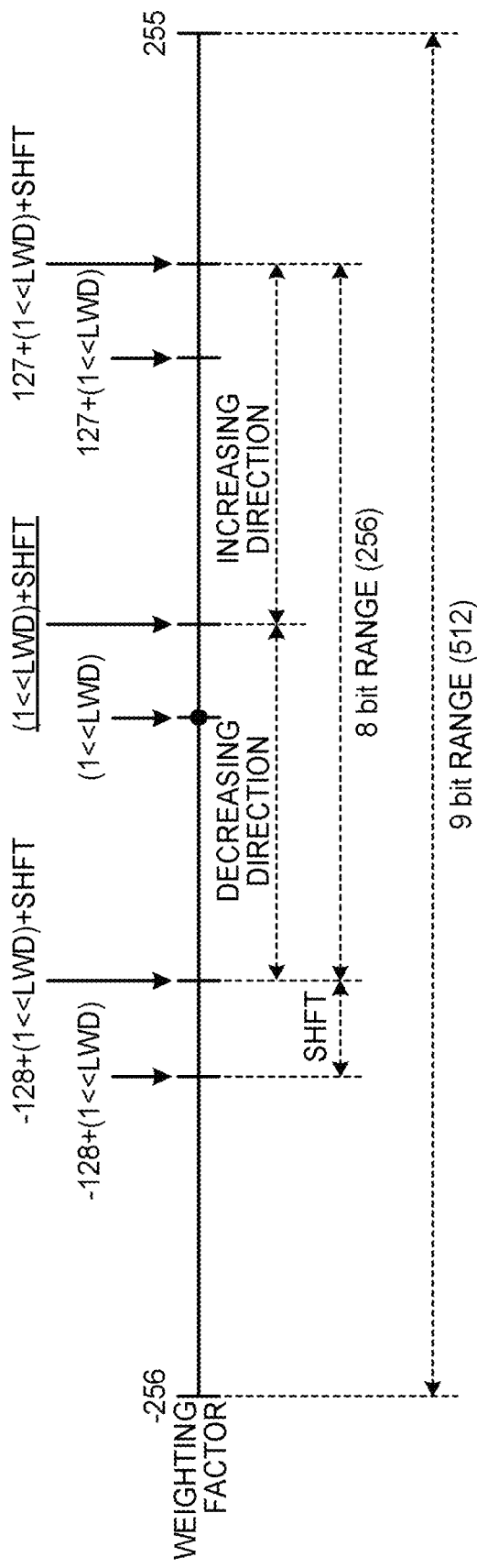
FIG. 23 is an explanatory diagram that illustrates an example of the selection range of a weighting factor according to Modification 2.

FIG. 23 is an explanatory diagram that illustrates an example of the selection range of the weighting factor according to Modification 2. In the example illustrated in FIG. 23, differently from the selection range of the weighting factor described with reference to FIG. 9, a new reference value $((1<<LWD)+SHFT)$ acquired by adding a shift value SHFT to the reference value $(1<<LWD)$ of the weighting factor is arranged to be positioned at the approximate center of the selection range, and a value $(-128+(1<<LWD)+SHFT)$ acquired by subtracting 128 from this value is a minimum value of the selection range, and a value $(127+(1<<LWD)+SHFT)$ acquired by adding 127 to this value is a maximum value of the selection range. At this time, while there are cases where the maximum value is larger than 255 based on the value of the fixed point precision LWD, the index setting unit 108 may perform a clipping process with the maximum value being set to 255 or may change the value of SHFT that can be taken for each fixed point. In addition, in Modification 2, while an example has been described in which the selection range of the weighting factor is derived by the index setting unit 108, the deriving of the selection range is not limited thereto but may be performed by the encoding unit 110.

Figure 24:
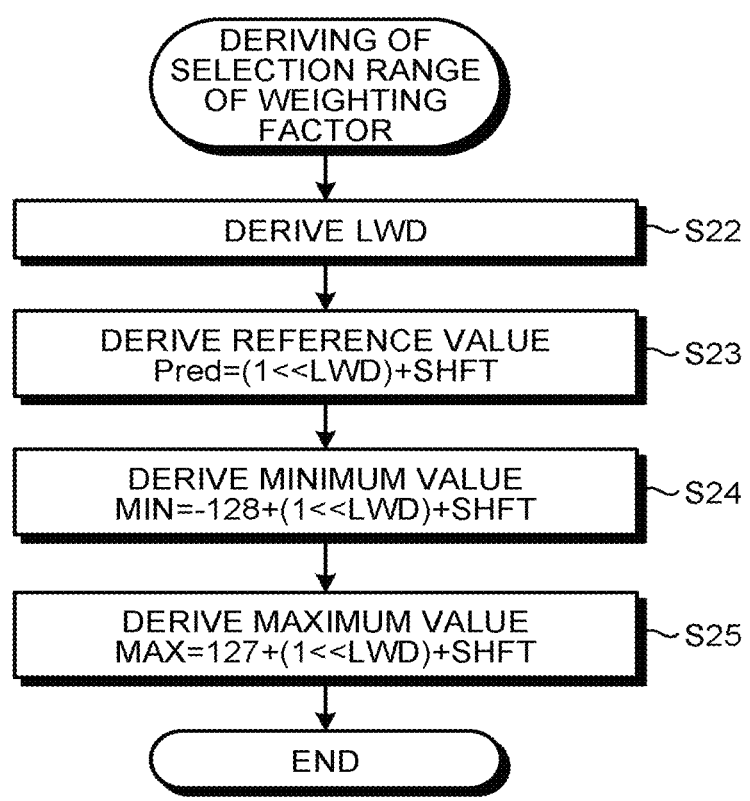
FIG. 24 is a flowchart that illustrates an example of the process of deriving the selection range of the weighting factor according to Modification 2.

FIG. 24 is a flowchart that illustrates an example of the process of deriving the selection range of the weighting factor according to Modification 2. Here, while a case will be assumed to be described in which the index setting unit 108 performs the process of deriving the selection range of the weighting factor, as described above, the selection range may be derived by the encoding unit 110.

First, the index setting unit 108 derives the fixed point precision LWD of the weighting factor (Step S22). Here, the index setting unit 108 may derive the fixed point precision LWD of the weighting factor either from the WP parameter information or from the index information.

Subsequently, the index setting unit 108 derives a reference value $((1<<LWD)+SHFT)$ of the weighting factor by using the fixed point precision LWD and the shift value SHFT that have been derived (Step S23).

Subsequently, the index setting unit 108 subtracts 128 from the derived reference value ((1<<LWD)+SHFT) of the weighting factor, thereby deriving a minimum value of the selection range of the weighting factor (Step S24).

Subsequently, the index setting unit 108 adds 127 to the derived reference value ((1<<LWD)+SHFT) of the weighting factor, thereby deriving a maximum value of the selection range of the weighting factor (Step S25).

Then, the index setting unit 108 checks that the weighting factor is included within the derived selection range of the weighting factor. In addition, in a case where it is checked that the weighting factor is not included in the derived selection range of the weighting factor, the index setting unit 108 may perform a clipping process using a maximum value or a minimum value of the selection range of the weighting factor. In such a case, the index setting unit 108 may clip the weighting factor to the minimum value in a case where the weighting factor is less than the minimum value of the selection range and clip the weighting factor to the maximum value in a case where the weighting factor is more than the maximum value of the selection range. By introducing such a clipping process, the value of the encoding target such as the difference value between the weighting factors takes a value within the predetermined bit precision without arranging a specific range restriction, and accordingly, the configuration of the circuit scale used by the hardware can be clarified.

As above, in Modification 2, in the selection range of the weighting factor, values are assigned in the negative direction and the positive direction with a reference value shifted by a predetermined value with a change in the weighting factor being considered set as the center, the range of values to be encoded can be fixed.

Modification 2 of Second Embodiment

In the second embodiment, while the selection range of the weighting factor has been described to be derived in the decoding device 800, in Modification 2 of the second embodiment, an example will be described in which the selection range of the weighting factor is shifted when the selection range of the weighting factor is derived in the decoding device 800. In Modification 2 of the second embodiment, the index setting unit 806 shifts the selection range of the weighting factor when the selection range of the weighting factor is derived. The deriving of the selection range of the weighting factor is the same as that of Modification 2 of the first embodiment, and thus, detailed description will not be presented. In addition, the selection range of the weighting factor may be derived not by the index setting unit 806 but by the index reconfiguring unit 801B.

As above, in Modification 2 of the second embodiment, in the selection range of the weighting factor, values are assigned in the negative direction and the positive direction with a reference value shifted by a predetermined value with a change in the weighting factor being considered set as the center, the range of values to be decoded can be fixed.

Modification 3 of First Embodiment

In Modification 3, a deriving technique other than the deriving technique of the selection range of the weighting factor in the encoding device 100 according to the first embodiment will be described.

In Modification 3, luma_weight_lx[i] represented in Numerical Expressions 14 to 16 has a fixed selection range, and delta_luma_weight_lx[i] has a dynamic selection range in accordance with LWD. In addition, the selection range of the weighting factor luma_weight_lx[i] of Modification 5 is as illustrated in FIG. 9.

Figure 25:
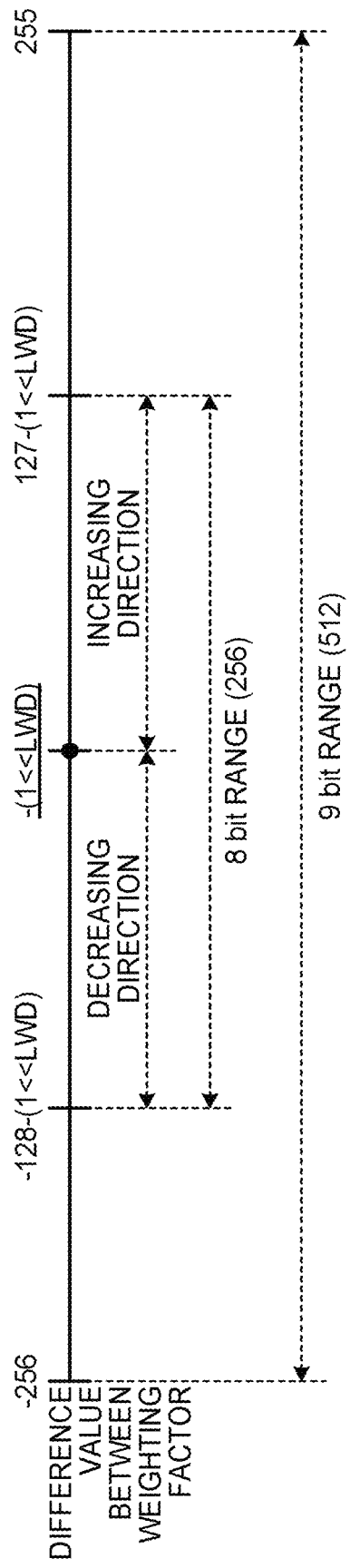
FIG. 25 is an explanatory diagram that illustrates an example of the range of a difference value between weighting factors of an encoding target according to Modification 3.

FIG. 25 is an explanatory diagram that illustrates an example of the range of a difference value between weighting factors of an encoding target according to Modification 3. In the example illustrated in FIG. 25, the difference value delta_luma_weight_lx[i] of the weighting factor takes a signed 9-bit value for performing addition or subtraction of a signed 8-bit signal. On the other hand, the reference value of the weighting factor takes a value increasing in accordance with the fixed point precision, and the difference value between the weighting factors tends to be inclined to the negative side as the value of the fixed point precision increases.

FIG. 26 is an explanatory diagram that illustrates an example of the relation between values of syntax elements according to Modification 3 and illustrates the relation between values of luma_log 2_weight_denom, default_luma_weight_lx, luma_weight_lx[i], and delta_luma_weight_lx[i]. It is understood that delta_luma_weight_lx[i] that is a syntax element encoded by the entropy encoding unit 110A, in other words, the range taken by the difference value between the weighting factors, as illustrated in FIG. 19, tends to be inclined to the negative side as the value of luma_log 2_weight_denom representing the fixed point precision increases. In addition, it is understood that the value luma_weight_lx[i] of the decoded weighting factor has a fixed range of −128 to 127.

As above, according to Modification 3, the range of the difference value to be encoded is set such that the value of the decoded weighting factor has a fixed selection range, and accordingly, even in a case where a prediction method is changed, the same selection range as that of H.264 can be set.

Modification 3 of Second Embodiment

In Modification 3 of the second embodiment, a deriving technique other than the deriving technique of the selection range of the weighting factor in the decoding device 800 according to the second embodiment will be described. However, the deriving technique of the selection range of the weighting factor according to Modification 3 of the second embodiment is the same as Modification 3 of the first embodiment, and thus, detailed description thereof will not be presented.

As above, according to Modification 3 of the second embodiment, the range of the difference value to be decoded is set such that the value of the weighting factor has a fixed selection range, and accordingly, even in a case where a prediction method is changed, the same selection range as that of H.264 can be set.

Modification 4 of First Embodiment

In Modification 4, an example will be described in which the selection range of the weighting factor is shifted when the selection range of the weighting factor according to Modification 3 of the first embodiment is derived.

In Modification 4, while the index setting unit 108 shifts the range of the difference value between the weighting factors to the positive side, this is equivalent to substantially shifting the selection range of the weighting factor after decoding to the positive side.

Figure 27:
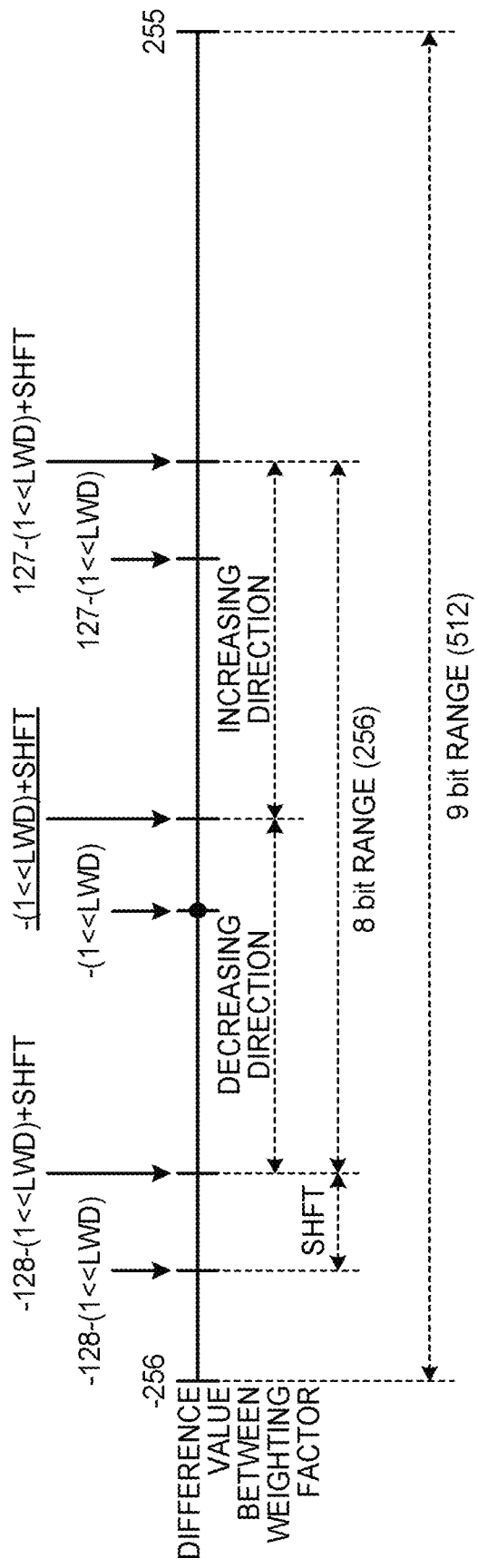
FIG. 27 is an explanatory diagram that illustrates an example of the range of a difference value between weighting factors according to Modification 4.

FIG. 27 is an explanatory diagram that illustrates an example of the range of the difference value between weighting factors according to Modification 4. Compared to Modification 3 of the first embodiment, the range of the difference value between the weighting factors taking a value in the 8-bit range of −128 to 127 is shifted by SHFT to the positive side.

FIG. 28 illustrates the selection range of the weighting factor after decoding according to Modification 4. From FIG. 28, it can be understood that, in Modification 4, the range of the weighting factor is shifted to the positive side by the amount of shift of the difference value. Even under such a configuration, the reference value of a case where LWD is 7, which cannot be conventionally selected, can be selected.

Modification 4 of Second Embodiment

In Modification 4 of the second embodiment, an example will be described in which the selection range of the weighting factor is shifted when the selection range of the weighting factor according to Modification 3 of the second embodiment is derived. However, the technique for shifting the selection range of the weighting factor according to Modification 4 of the second embodiment is the same as that of Modification 4 of the first embodiment, and thus detailed description will not be presented. Even under such a configuration, the reference value of a case where LWD is 7, which cannot be conventionally selected, can be selected.

Modification 5 of First Embodiment

In Modification 5, an example will be described in which a wrapping process is performed for the difference value between the weighting factor according to Modifications 3 and 4 of the first embodiment.

As described with reference to FIG. 25, the difference value between the weighting factors is a singed 9-bit signal (−256 to 126) and is inclined to the negative side as the fixed point precision increases. Generally, the weighting factor is entropy-encoded using an exponential Golomb coding or the like, and accordingly, in a case where the balance is inclined to the positive/negative side, there are cases where the coding efficiency is lowered. Although the range of the difference value between the weighting factors differs in accordance with the fixed point precision, the range of a case where the fixed point precision is determined is within 8 bits. For example, in a case where LWD is 7, the range of the difference value is −256 to −1, and when the range is shifted with respect to the reference 0, the range corresponds to values of 8 bits of 0 to 255. Accordingly, the index reconfiguring unit 110B performs a wrapping process for signed 9 bits to unsigned 8 bits in accordance with the fixed point precision. In such a case, a value in the positive direction takes a conventional value, and a value in the negative direction is connected to the distal end of the positive values.

FIG. 29 is a flowchart that illustrates an example of the wrapping process of the difference value between weighting factors according to Modification 5.

First, the index reconfiguring unit 110B derives fixed point precision LWD of the weighting factor from index information (Step S32).

Subsequently, the index reconfiguring unit 110B derives the weighting factor from the index information (Step S33).

Subsequently, the index reconfiguring unit 110B derives a reference value (1<<LWD) of the weighting factor using the derived fixed point precision LWD (Step S34).

Subsequently, the index reconfiguring unit 110B derives a difference value between the weighting factors using Numerical Expression (14) (Step S35).

Subsequently, the index reconfiguring unit 110B performs a wrapping process based on the reference value (1<<LWD) of the weighting factor and, by maintaining positive values and connecting negative values to the rear of a positive maximum value, generates an unsigned 8-bit code (Step S36).

Then, entropy coding is performed for the code generated by the index reconfiguring unit 110B by the entropy encoding unit 110A.

As above, in Modification 5, by performing the wrapping process for the values of singed 9 bits, the values can be constantly encoded into unsigned 8 bits, and whereby hardware such as an exponential Golomb encoding unit of signed 9 bits does not need to be arranged.

Modification 5 of Second Embodiment

In Modification 5 of the second embodiment, an example will be described in which a wrapping process is performed for the difference value between the weighting factors in Modifications 3 and 4 of the second embodiment.

As described with reference to FIG. 25, the difference value between the weighting factors is a singed 9-bit signal (−256 to 126) and is inclined to the negative side as the fixed point precision increases. Generally, the weighting factor is entropy-encoded using an exponential Golomb coding or the like, and accordingly, in a case where the balance is inclined to the positive/negative side, there are cases where the coding efficiency is lowered. Although the range of the difference value between the weighting factors differs in accordance with the fixed point precision, the range of a case where the fixed point precision is determined is within 8 bits. For example, in a case where LWD is 7, the range of the difference value is −256 to −1, and when the range is shifted with respect to the reference 0, the range corresponds to values of 8 bits of 0 to 255. Accordingly, the index reconfiguring unit 801B performs a wrapping process for signed 9 bits to unsigned 8 bits in accordance with the fixed point precision. In such a case, a value in the positive direction takes a conventional value, and a value in the negative direction is connected to the distal end of the positive values.

FIG. 30 is a flowchart that illustrates an example of a restoration process of a weighting factor according to Modification 5 of the second embodiment.

First, the index reconfiguring unit 801A derives fixed point precision LWD of the weighting factor by decoding encoded data (Step S42).

Subsequently, the index reconfiguring unit 801A decodes the encoded data next, thereby decoding an unsigned 8-bit code representing the difference value between the weighting factors (Step S43).

Subsequently, the index reconfiguring unit 801B derives a reference value (1<<LWD) of the weighting factor using the derived fixed point precision LWD (Step S44).

Subsequently, the index reconfiguring unit 801B restores the unsigned 8-bit code to a difference value between signed 9 bits by using the derived reference value ((1<<LWD) of the weighting factor (Step S45). Here, values less than the reference value are maintained based on the decoded data, and codes that are the reference value or more are connected to the negative side, whereby the difference values are restored. As above, the restored difference value between the weighting factors is derived, and the weighting factor is restored using Numerical Expression (15).

As above, in Modification 5 of the second embodiment, by performing the wrapping process for the values of singed 9 bits, the values can be constantly encoded into unsigned 8 bits, and whereby hardware such as an exponential Golomb encoding unit of signed 9 bits does not need to be arranged.

Modification 6

In the first and second embodiments described above, an example has been described in which the frame is divided into rectangular blocks each having a size of 16×16 pixels or the like and is encoded/decoded in order from an upper left block of the screen toward the lower right block (see FIG. 2A). However, the encoding order and the decoding order are not limited to those illustrated in this example. For example, the encoding and the decoding may be performed in order from the lower right side toward the upper left side, or the encoding and the decoding may be performed so as to draw a whirlpool from the center of the screen toward the end of the screen. In addition, the encoding and the decoding may be performed in order from the upper right side toward the lower left side, or the encoding and the decoding may be performed so as to draw a whirlpool from the end of the screen toward the center of the screen. In such a case, since the position of an adjacent pixel block that can be referred to in accordance with the encoding order changes, the position may be changed to an appropriately usable position.

In the first and second embodiments described above, while the description has been presented with the size of a prediction target block such as a 4×4 pixel block, an 8×8 pixel block, a 16×16 pixel block or the like being illustrated as an example, the prediction target block need not have a uniform block shape. For example, the size of the prediction target bock may be a 16×8 pixel block, an 8×16 pixel block, an 8×4 pixel block, a 4×8 pixel block, or the like. In addition, it is not necessary to uniformed all the block sizes within one coding tree block, and a plurality of block sizes different from each other may be mixed. In a case where a plurality of block sizes different from each other are mixed within one coding tree block, the code amount for encoding or decoding division information increases in accordance with an increase in the number of divisions. Thus, it is preferable to select a block size in consideration of the balance between the code amount of the division information and the quality of a local encoded image or a decoded image.

In the first and second embodiments described above, for the simplification, comprehensive description of some parts has been presented for a color signal component without the prediction processes or the methods of deriving the selection ranges of the luminance signal and the color difference signal not being differentiated from each other. However, in a case where the prediction process or the method of deriving the selection range is different between the luminance signal and the color difference signal, the same prediction method or prediction methods different from each other may be used. In a case where prediction methods different from each other are used for the luminance signal and the color difference signal, encoding or decoding may be performed using the prediction method selected for the color difference signal similarly to that for the luminance signal.

In the first and second embodiments described above, for the simplification, a comprehensive description has been presented for a color signal component without the weighted motion compensated prediction processes of the luminance signal and the color difference signal not being differentiated from each other. However, in a case where the weighted prediction processes of the luminance signal and the color difference signal are different from each other, the same weighted prediction method or weighted prediction methods different from each other may be used. In a case where weighted prediction methods different from each other are used for the luminance signal and the color difference signal, encoding or decoding may be performed using the weighted prediction method selected for the color difference signal similarly to that for the luminance signal.

In the first and second embodiments described above, between the rows of the table represented in the syntax configuration, a syntax element not defined in this embodiment may be inserted, and a technique relating to other conditional branches may be included. Alternatively, a syntax table may be divided into a plurality of tables, or syntax tables may be integrated together. In addition, the same term need not be necessary used, but the term may be arbitrarily changed in accordance with a used form.

As described above, according to each embodiment and each modification, by employing a configuration in which the range of a value to be taken by the syntax element is defined when a weighted motion-compensated prediction is made, the range of the values according thereto is set within the range of the bit precision, and a short code length is given to a value that has an actual high use frequency, the problem of encoding redundant information of the syntax element is solved, and the weighted motion compensated prediction process having high efficiency is realized. Therefore, according to each embodiment and each modification, the coding efficiency is improved, and subjective image quality is improved.

Figure 31:
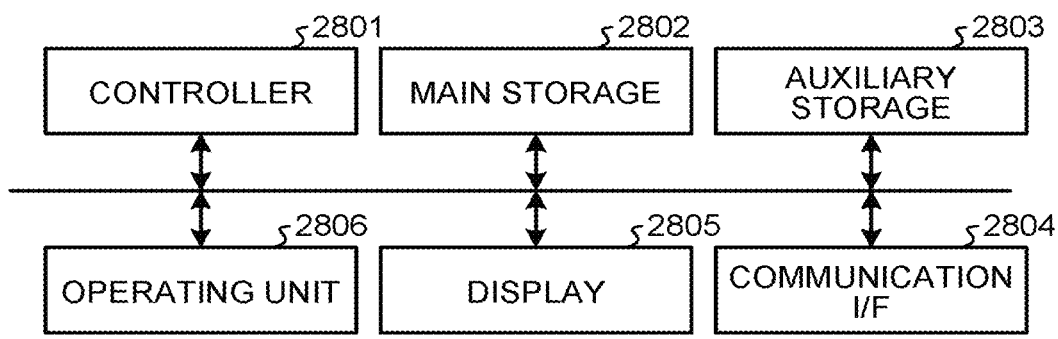
FIG. 31 is an explanatory view illustrating a hardware configuration of the device according to each embodiment.

Next, a hardware configuration of the device (the encoding device, and the decoding device) according to each embodiment will be described with reference to FIG. 31. FIG. 31 is an explanatory view illustrating a hardware configuration of the device according to each embodiment. The encoding device and the decoding device each comprise a control unit 2801, such as a CPU (Central Processing Unit) which controls the overall device, a main storage 2802, such as a ROM (Read Only Memory) or a RAM (Random Access Memory) which stores various data or programs, an auxiliary storage 2803, such as an HDD (Hard Disk Drive) or a CD (Compact Disk) drive which stores various data or programs, and a bus connecting these elements. This is a hardware configuration utilizing a conventional computer. Further, the encoding device and the decoding device are connected wirelessly or through a wire to a communication I/F (Interface) 2804 which controls communication with an external apparatus, a display 2805 which displays information, and an operating unit 2806, such as a keyboard or a mouse which receives instructions input by the user. Data to be encoded and data to be decoded may be stored in the HDD, or input by the disk drive apparatus, or input externally via the communication I/F 2804.

The hardware configuration shown in FIG. 31 is a mere example. The encoding device and the decoding device of each embodiment may be implemented partly or entirely by an integrated circuit such as an LSI (Large Scale Integration) circuit or an IC (Integrated Circuit) chip set. The functional blocks of the encoding device and the decoding device may be individually formed of a processor, or may be integrated partly or entirely as a processor. Integration of the circuits of the configuration is not limited to LSI, but may be implemented as a dedicated circuit or a general-purpose processor.

While several embodiments of the present invention have been described, such embodiments are presented as examples and are not for the purpose of limiting the scope of the invention. These novel embodiments can be performed in other various forms, and various omissions, substitutions, and changes can be made therein in a range not departing from the concept of the invention. These embodiments and modifications thereof belong to the scope or the concept of the invention and belong to the invention described in the claims and a scope equivalent thereto.

For example, a program realizing the process of each embodiment described above may be provided with being stored in a computer-readable storage medium. As the storage medium, a storage medium that can store a program and can be read by a computer such as a magnetic disk, an optical disc (a CD-ROM, a CD-R, a DVD, or the like), an magneto-optical disk (an MO or the like), or a semiconductor memory may be used regardless of the storage form.

In addition, the program realizing the process of each embodiment may be stored in a computer (server) connected to a network such as the Internet and be downloaded to a computer (client) through the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising:
   encoder circuitry configured to:
   encode a first denom (denominator) for a luma weighting factor;
   encode a first difference value that is equal to a value of a difference between the first denominator and a second denominator for a chroma weighting factor;
   encode a second difference value of the luma weighting factor, wherein the second difference value is equal to a value of a difference between the luma weighting factor and a first reference value, and the first reference value is equal to a value obtained by left shift of "1" by at least one binary digit specified by the first denominator, and the second difference value is in a fixed range of 128 to +127 regardless of the first denominator;
   encode a third difference value of the chroma weighting factor, wherein the third difference value is equal to a value of a difference between the chroma weighting factor and a second reference value, the second reference value is equal to a value obtained by left shift of "1" by at least one binary digit specified by the second denominator, and the third difference value is in a fixed range of 128 to +127 regardless of the second denominator; and
   encode a fourth difference value of a chroma offset, wherein the fourth difference value is equal to a value of a difference between the chroma offset and a third reference value, the fourth difference value is in a fixed range of $-2^n$ to $+2^n-1$, and the third reference value is equal to a value obtained by subtracting a value obtained by both multiplying a median value of a maximum pixel value by the chroma weighting factor and shifting to right for the at least one binary digit specified by the second denominator, from the median value.

2. The electronic apparatus according to claim 1, wherein:
   the value obtained by left shift of "1" by the at least one binary digit specified by the first denominator is equal to a specific luma weighting factor used if a target image had no difference in luma from a reference image.

3. The electronic apparatus according to claim 1 further comprising:
   a buffer configured to temporarily store at least part of encoded data; and,
   a transmitter configured to transmit the encoded data via a communication link,
   wherein the encoder circuitry is a Central Processing Unit (CPU).

4. The electronic apparatus according to claim 1 further comprising:
   a buffer configured to temporarily store at least part of encoded data; and,
   a transmitter configured to transmit the encoded data via a communication link,
   wherein the encoder circuitry is a Digital Signal Processor (DSP) or a Field Programmable Gate Array (FPGA).

5. A encoding method, comprising:
   encoding a first denom (denominator) for a luma weighting factor;
   encoding a first difference value that is equal to a value of a difference between the first denominator and a second denominator for a chroma weighting factor;
   encoding a second difference value of the luma weighting factor, wherein the second difference value is equal to a value of a difference between the luma weighting factor and a first reference value, and the first reference value is equal to a value obtained by left shift of "1" by at least one binary digit specified by the first denominator, and the second difference value is in a fixed range of −128 to +127 regardless of the first denominator;
   encoding a third difference value of the chroma weighting factor, wherein the third difference value is equal to a value of a difference between the chroma weighting factor and a second reference value, the second reference value is equal to a value obtained by left shift of "1" by at least one binary digit specified by the second denominator, and the third difference value is in a fixed range of −128 to +127 regardless of the second denominator; and
   encoding a fourth difference value of a chroma offset, wherein the fourth difference value is equal to a value of a difference between the chroma offset and a third reference value, the fourth difference value is in a fixed range of $-2^n$ to $+2^n-1$, and the third reference value is equal to a value obtained by subtracting a value obtained by both multiplying a median value of a maximum pixel value by the chroma weighting factor and shifting to right for the at least one binary digit specified by the second denominator, from the median value.

6. The encoding method according to claim 5, wherein:
   the value obtained by left shift of "1" by the at least one binary digit specified by the first denominator is equal to a specific luma weighting factor used if a target image has no difference in luma from a reference image.

7. The encoding method according to claim 5, wherein the method further comprises:
   temporarily storing, by a buffer, at least part of encoded data; and
   transmitting the encoded data via a communication link, and the encoding of the first denominator, the first difference value, the second difference value, the third difference value, and the fourth difference value are performed by a Central Processing Unit (CPU).

8. The encoding method according to claim 5, wherein the method further comprises:
   temporarily storing, by a buffer, at least part of encoded data; and
   transmitting the encoded data via a communication link, and
   the encoding of the first denominator, the first difference value, the second difference value, the third difference value, and the fourth difference value are performed by a Digital Signal Processor (DSP) or a Field Programmable Gate Array (FPGA).

9. A non-transitory computer readable medium storing computer executable instructions that, when executed by encoder circuitry, cause the encoder circuitry to:
   encode a first denom (denominator) for a luma weighting factor;
   encode a first difference value that is equal to a value of a difference between the first denominator and a second denominator for a chroma weighting factor;
   encode a second difference value of the luma weighting factor, wherein the second difference value is equal to a value of a difference between the luma weighting factor and a first reference value, and the first reference value is equal to a value obtained by left shift of "1" by at least one binary digit specified by the first denominator, and the second difference value is in a fixed range of −128 to +127 regardless of the first denominator;
   encode a third difference value of the chroma weighting factor, wherein the third difference value is equal to a value of a difference between the chroma weighting factor and a second reference value, the second reference value is equal to a value obtained by left shift of "1" by at least one binary digit specified by the second denominator, and the third difference value is in a fixed range of −128 to +127 regardless of the second denominator; and
   encode a fourth difference value of a chroma offset, wherein the fourth difference value is equal to a value of a difference between the chroma offset and a third reference value, the fourth difference value is in a fixed range of $-2^n$ to $+2^n-1$, and the third reference value is equal to a value obtained by subtracting a value obtained by both multiplying a median value of a maximum pixel value by the chroma weighting factor and shifting to right for the at least one binary digit specified by the second denominator, from the median value.

10. The non-transitory computer readable medium according to claim 9, wherein:
   the value obtained by left shift of "1" by the at least one binary digit specified by the first denominator is equal to a specific luma weighting factor used if a target image had no difference in luma from a reference image.

* * * * *